United States Patent
Aravinthan et al.

(10) Patent No.: US 10,341,260 B2
(45) Date of Patent: *Jul. 2, 2019

(54) EARLY QUEUEING NETWORK DEVICE

(71) Applicant: AVAGO TECHNOLOGIES INTERNATIONAL SALES PTE. LIMITED

(72) Inventors: Kandasamy Aravinthan, San Jose, CA (US); Rahul Durve, Cupertino, CA (US); Manoj Lakshmy Gopalakrishnan, Santa Clara, CA (US); Jinqlih Sang, Fremont, CA (US); David Lucius Chen, Mountain View, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,870

(22) Filed: Feb. 2, 2018

(65) Prior Publication Data

US 2018/0227247 A1 Aug. 9, 2018

Related U.S. Application Data

(63) Continuation of application No. 14/636,928, filed on Mar. 3, 2015, now Pat. No. 9,894,013.

(60) Provisional application No. 62/111,167, filed on Feb. 3, 2015.

(51) Int. Cl.
*H04L 12/935* (2013.01)
*H04L 12/947* (2013.01)

(52) U.S. Cl.
CPC ........ *H04L 49/3027* (2013.01); *H04L 49/251* (2013.01); *H04L 49/252* (2013.01)

(58) Field of Classification Search
CPC .. H04L 49/3027; H04L 49/251; H04L 49/252
See application file for complete search history.

(56) References Cited

U.S. PATENT DOCUMENTS

| | | | |
|---|---|---|---|
| 5,790,545 A | 8/1998 | Holt | |
| 6,671,275 B1 | 12/2003 | Wong | |
| 7,352,694 B1 | 4/2008 | Clovis | |
| 7,688,816 B2 | 3/2010 | Park | |
| 2002/0118692 A1* | 8/2002 | Oberman | ............ H04L 12/5601 370/419 |

(Continued)

*Primary Examiner* — Stephen J Clawson
(74) *Attorney, Agent, or Firm* — Xsensus LLP

(57) ABSTRACT

A network device, such as a network switch, can include an ingress to receive data packets from a network. The ingress can communicate with an egress included in the network device though a fabric included in the network device. At least one of ingress and the egress can enqueue a data packet prior to receipt of all cells of the data packet. The ingress can also commence with dequeue of the cells of the received data packet prior to receipt of the entire data packet from the network. At least one of ingress and the egress can process the data packets using cut-through processing and store-and-forward processing. In a case of cut-through processing of a data packet at both the ingress and the egress of a network device, such as CIOQ switch, the fabric can be allocated to provide a prioritized virtual channel through the fabric for the data packet.

20 Claims, 13 Drawing Sheets

(56) References Cited

U.S. PATENT DOCUMENTS

| | | |
|---|---|---|
| 2003/0223438 A1* | 12/2003 | Mathews ............ H04L 49/3018 370/401 |
| 2005/0135356 A1* | 6/2005 | Muthukrishnan ....... H04L 47/30 370/389 |
| 2010/0158031 A1 | 6/2010 | Thomas |
| 2011/0261814 A1 | 10/2011 | Matthews et al. |
| 2012/0155256 A1 | 6/2012 | Pope |
| 2013/0322243 A1 | 12/2013 | Matthews |
| 2013/0322244 A1 | 12/2013 | Matthews |
| 2013/0322271 A1 | 12/2013 | Matthews et al. |
| 2014/0098818 A1 | 4/2014 | Matthews et al. |
| 2015/0078388 A1* | 3/2015 | Mani .................... H04J 3/0635 370/394 |

* cited by examiner

|   | Previous packet | | Current packet | | Next packet | | |
|---|---|---|---|---|---|---|---|
|   | Ptr | Sptr | Done | Ptr | eng | Ptr | Sptr | done |
| 1 | A | P(A) | 1 | B | 1 | 0 | N/A | 0 |
| 2 | 0 | N/A | 0 | C | 0 | 0 | N/A | 0 |
| 3 | 0 | N/A | 0 | 0 | 0 | 0 | N/A | 0 |

Figure 4

| | Previous packet | | | Current packet | | | Next packet | |
|---|---|---|---|---|---|---|---|---|
| Ptr | Sprt | Done | Ptr | enq | Ptr | Sprt | done |
| 1 | A | P(A) | 1 | B | 1 | C | P(C) | 0 |
| 2 | B | P(B) | 0 | C | 1 | 0 | N/A | 0 |
| 3 | 0 | N/A | 0 | 0 | 0 | 0 | N/A | 0 |

Figure 5

| | Previous packet | | | Current packet | | | Next packet | |
|---|---|---|---|---|---|---|---|---|
| Ptr | Sprt | Done | Ptr | enq | Ptr | Sprt | done |
| 1 | A | P(A) | 1 | B | 1 | 0 | N/A | 0 |
| 2 | 0 | N/A | 0 | C | 0 | 0 | N/A | 0 |
| 3 | 0 | N/A | 0 | 0 | 0 | 0 | N/A | 0 |

Figure 6

|   | Previous packet | | Current packet | | Next packet | | |
|---|---|---|---|---|---|---|---|
|   | Ptr | Sprt | Ptr | enq | Ptr | Sprt | done |
| 1 | A | P(A) | B | 1 | C | P(C) | 1 |
| 2 | B | P(B) | C | 1 | D | P(D) | 0 |
| 3 | C | P(C) | D | 1 | 0 | N/A | 0 |

Figure 8

EARLY QUEUEING NETWORK DEVICE

PRIORITY CLAIM

The present application is a continuation application which claims the benefit of priority under 35 U.S.C. § 120 of U.S. patent application Ser. No. 14/636,928, filed Mar. 3, 2015, which claims the benefit of priority to U.S. provisional patent application Ser. No. 62/111,167, filed Feb. 3, 2015 which is incorporated by reference in its entirety.

TECHNICAL FIELD

This disclosure relates to network devices and more particularly to early queuing in a network device such as a network switch.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in packet handling by network switching devices can reduce latency in delivery of data packets to one or more destination recipients.

BRIEF DESCRIPTION OF THE DRAWINGS

FIG. 4 is an example scenario to illustrate operation of an embodiment of traffic management circuitry regarding storage of information in a packet queue.

FIG. 5 is an example scenario to illustrate further operation of an embodiment of the traffic management circuitry regarding storage of information in a packet queue.

FIG. 6 is another example scenario to illustrate further operation of an embodiment of the traffic management circuitry regarding storage and management of information.

FIG. 8 is another example scenario to illustrate further operation of an embodiment of the traffic management circuitry regarding storage and management of information.

DETAILED DESCRIPTION

The discussion below makes reference to a network device, such as a network switch and operation of early queueing in a network device as it relates to store-and-forward and/or cut through operation in a network switch. The present disclosure describes early queuing in applications such as in a combined input/output queued (CIOQ) switch that involves at least two stages of store-and-forward, or a switch that includes only a single stage of store-and-forward, such as an output queued switch. To avoid latency, such as the latency created by the multiple stages, for both store-and-forward and cut through processing of data packets, cells of a data packet can be en-queued prior to receipt of the entirety of the packet. In addition, based on the packet being en-queued, de-queuing of the cells can commence prior to receiving the entirety of the packet from the network.

In addition, both store-and-forward and cut through operations can use the same queues by using combined queues for both operations. Latency can be minimized using the combined queues by skipping store-and-forward queuing if the combined queues are empty at the time a packet is received and enqueued, thereby eliminating queueing latency.

The network device can include an ingress, or ingress circuitry, a fabric, or fabric circuitry, and an egress, or egress circuitry. The ingress circuitry can provide cut-through processing of the received data packet and establish a virtual channel through the fabric to the egress circuitry so that the egress circuitry can provide cut-through processing of the received data. In an example of a CIOQ switch, such queue skipping may be at the ingress or the egress, whereas in an example of an output queued switch, the queue skipping may occur at the egress.

The described embodiments may be used with any form of network device to minimize latency, such as a network switch, using store-and-forward and cut through processing of data packets. Example implementations include a CIOQ switch, an output queued switch, and an input queued switch. The following discussion may or may not be directed to any particular form or format of network device, and may also describe aspects and functionality of particular network devices, such as a CIOQ switch, in order to allow the reader to readily digest the discussion. The disclosure, however, should not limited to any particular type of network device, or any particular type of switch, such as a CIOQ switch or an output queued switch.

Figure 1:
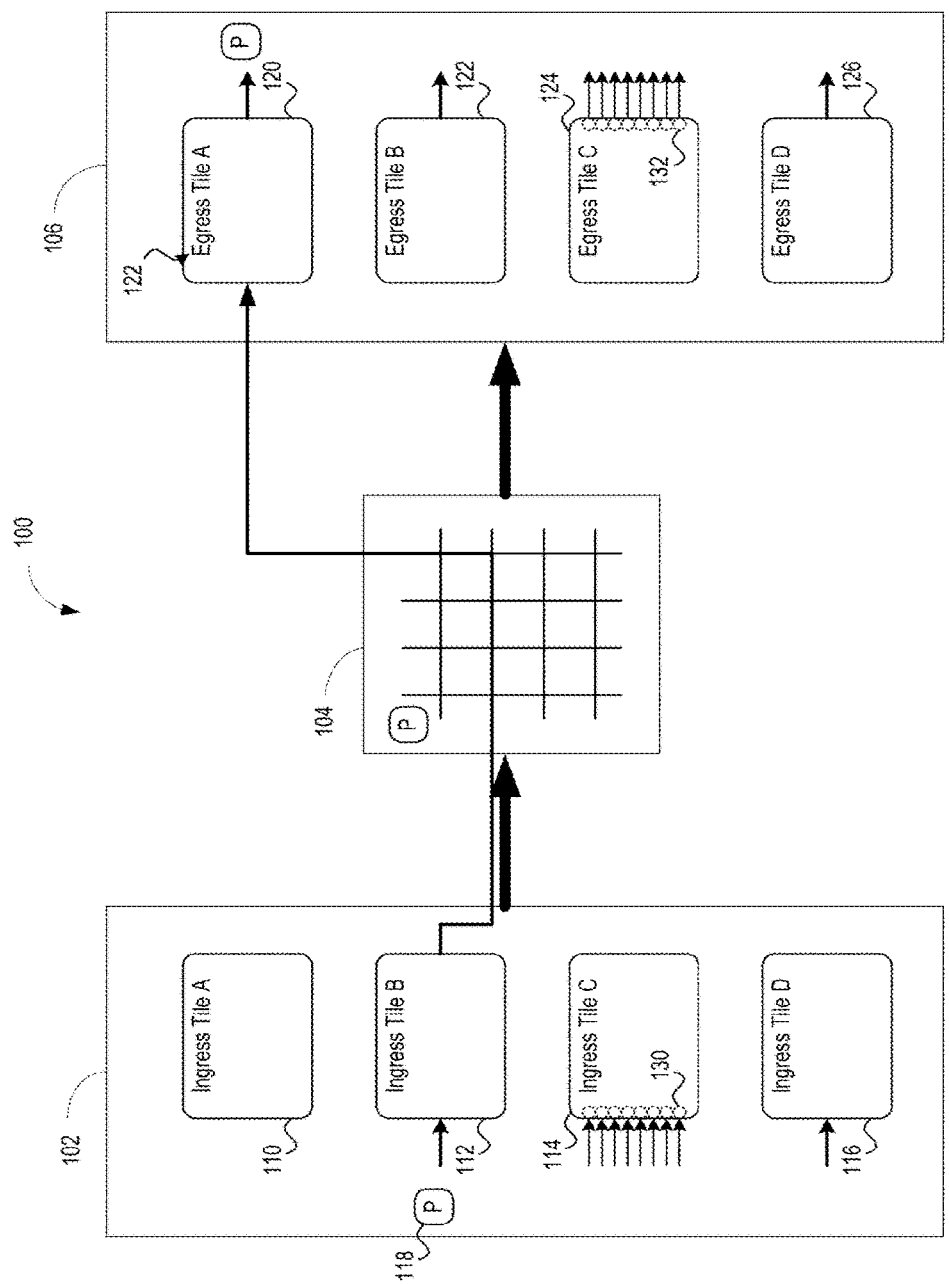
FIG. 1 illustrates an example block diagram of a network device.

FIG. 1 shows an example block diagram of a network device 100, such as a network switch that switches data packets from input ports to output ports. The network device 100 may be part of a network that can include various devices, such as one or more servers and/or one or more computers, or any other network devices capable of communicating over a network such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device. One or more network devices, such as network switches can be implemented to facilitate communication between the one or more other devices of the network. Some or all of the devices of the network may be connected or otherwise in packet based communication with each other, through or using the network device.

The network device 100 may include electrical and/or optical networking transceivers. Examples of electrical networking transceivers include coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

The network device 100 may receive network data in the form of data packets through the one or more networks including, for example, the Internet, or other LAN/WAN networks whether private or public, from many different sources. Similarly, the network device 100 may transmit network data through one or more networks to many different destinations. Examples of sources and destinations include file servers; communication satellites; computer systems; network devices such as switches, routers, and hubs; and remote databases; as well as mobile devices connected, for example, through cellular base stations. The network device may access local databases or cloud based databases.

The network device 100 may include circuitry in the form of one or more processors and memories. The memory can store, for example, control instructions that the processor executes to carry out at least a portion of the functionality of the described network device. The control instructions can provide and specify configuration and operating options for the network device 100.

The example network device 100 may be a network switch that includes an ingress (IMMU) 102, a fabric (IFI) 104 and an egress (EMMU) 106. The ingress 102 can includes several ingress tiles, such as, the ingress tiles 110, 112, 114, and 116, and egress 106 can include several egress tiles, such as, the egress tiles 120, 122, 124, and 126. Each of the ingress and egress tiles 110-116 and 120-126 can include a collection of ports (input ports and output ports) that transmit and/or receive data packets. The fabric 104 can provide a communication path for the data packets between the ingress 102 and the egress 106 such that any of the ingress tiles 110-116 can be in communication with any of the egress tiles 120-126.

During example operation, a packet (P) 118 can arrive at an input port of an ingress tile, such as ingress tile B 112, and be enqueued into the ingress 102. Under control of the network device 100, the packet 118 can be dequeued to flow from the ingress 102 through the switching fabric 104 to the egress 106. At the egress 106, the packet 118 can arrive at an egress tile, such as egress tile A 120. The egress tile A 120 can send the packet 118 to a further destination through an output port of the egress tile A 120.

The network device 100 can selectively perform store-and-forward, or cut-through of packet data from the ingress 102 to the egress 106 using early queuing and common queues for both store-and-forward data packets and cut-through data packets to minimize latency. This type of cut-through which can be referred to as early queuing cut-through can also absorb control loop delay in packet traffic flow between the input ports and the output ports. Absorbing the control loop delay translates to a further reduction in latency for the applications receiving the packet traffic flow. Early queuing cut-through can be used to forward selected packets, such as packet 118, from an input port in the ingress 102 directly to an output port buffer for an output port in the egress 106. The early queuing cut-through may bypass one or more buffers in the ingress and/or the egress, where the packet 118 would otherwise be queued for eventual delivery to the output port in the egress 106. In some implementations, the cut-through can be between the ingress 102 and the egress 106 such that the input buffer at an input port can be bypassed, but the output buffer at the output port is not bypassed. In addition to bypassing the buffers, the early queuing cut-through may also bypass other processing of a received data packet.

Each ingress tile and egress tile may be implemented as a unit, such as on a single die, one or more integrated circuits, or a system on a chip, or may be implemented as physically separate units. A die may refer to a block of semiconducting material, on which a given functional or integrated circuit may be fabricated. Each tile may handle multiple ports, any of which may be configured to be input only, output only, or bi-directional. Thus, each tile may be locally responsible for the reception, queueing, processing, and transmission of packets received and sent over the ports associated with that tile.

As an example, the ingress tile C 114 can include eight ports, one of which is labeled port 130, and the egress tile C 124 can similarly include eight ports, one of which is labeled 132. Each port may provide a physical interface to other networks or devices, such as through a physical network cable (e.g., an Ethernet cable). Furthermore, each port may have its own line rate (i.e., the rate at which packets and received and sent on the physical interface). For example, the line rates may be 10 Mbps, 100 Mbps, 1 Gbps, or any other line rate. In the example of FIG. 1, assuming 1 Gbps line rate, 8 ports per tile and 4 tiles, the device architecture would have an aggregate bandwidth of 32 Gbps. The techniques described, however, are not limited to any particular configuration of line rate, number of ports, arrangement of ports by tiles, or number of tiles.

Figure 2:
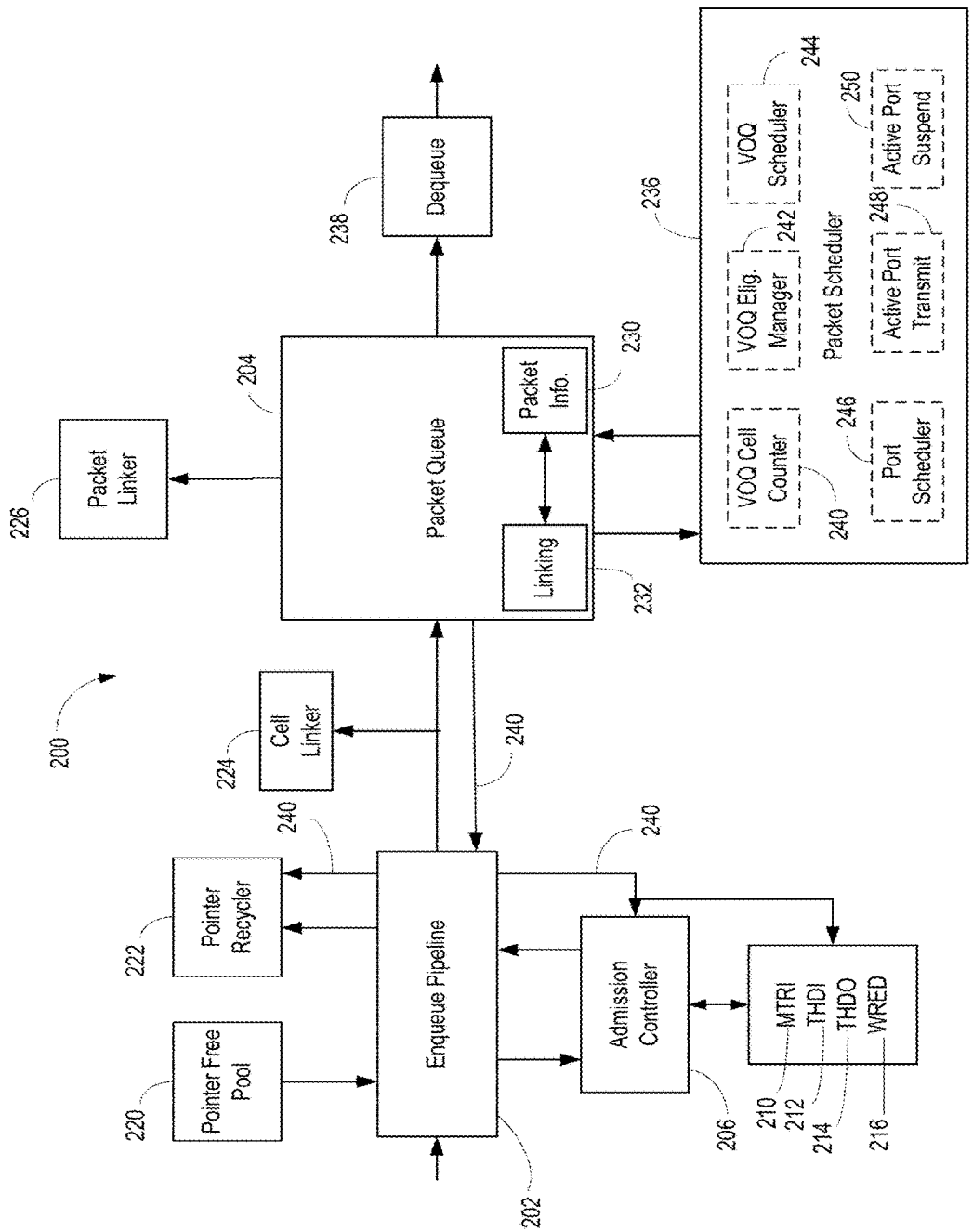
FIG. 2 is an example block diagram of a portion of traffic management circuitry illustrating the functionality of circuitry included in a network device.

FIG. 2 is an example block diagram of a portion of traffic management circuitry 200 illustrating the functionality of circuitry included in a network device. The traffic management circuitry 200 includes an enqueue pipeline 202 that receives and processes data packets. The enqueue pipeline 202 operates to qualify and accept the received data packets, including determining if the received data packet should be enqueued into a packet queue 204 included in the traffic management circuitry 200. An admission control 206 may operate in connection with the enqueue pipeline 202 to decide whether a data packet should be admitted into the packet queue 204. The admission controller 206 may use one or more different techniques to evaluate a data packet for admission to the packet queue 204. In the example of FIG. 2, an input metering thresholding (MTRI) technique 201, an input threshold (THDI) technique 212, an output threshold (THDO) technique 214, and/or a weighted random early detection (WRED) technique 216 may be used by the admission controller 206 to determine if a data packet should be enqueued.

A data packet received at the enqueue pipeline 202 can be divided into cells, which are queued into the packet queue 204. A pointer free pool 220 included in the traffic management circuitry 200 can be used to maintain separation of the segments or cells into which the data packet is divided using pointers to identify the different cells of a data packet. In the event a data packet is dropped, the pointer free pool can release the pointers identifying the different cells included in that particular data packet. In addition, the pointers that identify the segmentation of the data packet into cells can be recycled for reuse in another data packet by a pointer recycler 222 included in the traffic management circuitry 200. A cell linker 224 may also be included in the traffic management circuitry 200. The cell linker 224 can be used in connection with the enqueue pipeline 202 to link together the related cells in a data packet, when a data packet is received and segmented into cells by the enqueue pipeline 202.

In addition to storage of cells for data packets, the traffic management circuitry 200 can also store data packet information and linking information. The data packet information can be stored in a packet information database 230. Data packet information can include a packet structure of a data packet. The packet structure being stored can include, for example, a head entry, a tail entry, and associated information. The head entry may include indication of whether dequeuing of the data packet has started, and the tail entry may indicate if the tail packet (EOP indication) has been fully received, and the source port of the data packet. As described later, the decision to repair may be based on the data packet information. The linking information can be stored in a link repair database 232. The linking information stored in the link repair database 232 can include sequence information related to string, or group, of related data packets. The sequence information can include identification of a status of a previous data packet, a status of a next data packet, and identification of a just received data packet as a current packet.

As further described elsewhere, a packet linker 234 can be included in the traffic management circuitry 200. The packet linker 234 can be used in connection with each data packet queued into the packet queue 204 to update the link repair database 232. Packet linking may involve linking together a chain of cells, which can include identification of where the start of packet (SOP) is positioned in the chain of cells. Enqueuing of cells of a received data packet into the packet queue 204 can be initiated or triggered in response to a predetermined condition. An example predetermined condition can be when a cell included within the data packet is identified by the enqueue pipeline 202 as being a start of packet (SOP) in a cell of a data packet. The SOP may be indicated in the cell, or may be detected as being an SOP. Alternatively, or in addition, an example predetermined condition may occur when a threshold is reached, such as a predetermined number of cells are received in the traffic management circuitry 200. Receipt of a predetermined number of cells may be used to ensure that the packet queue 204 does not become empty (run dry) while a data packet is being processed. A threshold may be predetermined based on, for example, an input port speed and an output port speed, to avoid emptying the packet queue 204 when a relative slow input port (such as 10 GB/s) is used with a relatively fast output port (such as 100 GB/s).

The traffic management circuitry 200 may also include a packet scheduler 236. The packet scheduler 236 may control the dequeuing of a data packet out of the packet queue 204 using a dequeuer 238 included in the traffic management circuity 200. Dequeuing out of the packet queue 204 can involve use of a virtual output queue (VOQ). Virtual output queues can be defined by the packet queue 204 to link data packets to egress output ports by mapping the received data packets from input ports to output ports. A virtual output queue can be activated by the packet queue 204 such that packet dequeuing commences when a predetermined condition occurs prior to receipt of the entire packet. Thus, the packet queue 204 may initiate dequeuing of cells of a data packet prior to receipt of the entire packet at the network device. For example, dequeuing of cells of a received packet from the virtual output queue may be initiated before an end of packet (EOP) indication is received at the network device. Since dequeuing from the virtual output queue may commence before an EOP indication is received, latency of the transfer of a data packet through a network device, such as a network switch can be reduced.

In an example implementation, when the packet information database is determined to not be empty (a data packet has been enqueued), the virtual output queue can be activated by the packet scheduler 236 to initiate dequeuing of the enqueued data packet. Early dequeuing can cause the virtual output queue to become empty while awaiting cells of a data packet to be received (arrive at the network device). Thus, the packet scheduler 236 can control the virtual output queue accordingly. In an example embodiment, the packet scheduler 236 can be a work conserving scheduler that efficiently operates one or more virtual output queues to maintain a uniform transfer rate of cells of the data packets. For example, each egress port may have an associated virtual output queue from which data packets are dequeued. The packet scheduler 236 may operate in a multiplexed fashion to service all of the virtual output queues using arbitration. The quantity of virtual output queues actively dequeuing data packets (open contexts) can be limited to a predetermined number in accordance with the packet scheduler's capabilities or any other constraint to minimize latency.

Predetermined conditions to initiate dequeuing can vary depending on the network device. For example, in a CIOQ switch, the predetermined condition can be receipt of credit messages from an egress credit scheduler. In an example, the egress credit scheduler may provide credit messages indicating how many cells of a packet (or bytes) the virtual output queue is allowed to send through the fabric to a particular output port of the IMMI. In another example of a output queued switch, the IMMI may provide credit messages indicating how many cells of a packet (or bytes) the virtual output queue is allowed to output onto a link such as a wire coupled with the network device. In an embodiment of a network device that is a CIOQ switch, the packet scheduler 236 can include circuitry that includes a VOQ cell counter 240, a VOQ eligibility manager 242, a VOQ scheduler 244, a port scheduler 246, an active port transmit 248, and an active port suspend 250. In other example embodiments, different configurations are possible to achieve the same functionality, and in some network devices at least some or all of this circuitry may not be present, as indicated by the dotted lines in FIG. 2.

The VOQ cell counter 240 can activate a virtual output queue upon enqueuing of a data packet. The VOQ cell counter 240 can also suspend a virtual output queue when predetermined conditions are present, such as when the virtual output queue 204 is empty before an EOP indication is received in a cell of an enqueued data packet. The VOQ eligibility manager 242 can transmit and receive messages from the fabric (104), such as QSM and Credit messages. In addition, the VOQ eligibility manager 242 can add eligibility queues to the VOQ scheduler 244, for different data packets, based on parameters such as high/low virtual output queue cell levels, criteria such as first-in/first-out, and/or source port or output port capacity/utilization. In addition, the VOQ eligibility manager can monitor for retired virtual output queues and add back in a retired virtual output queue if eligible.

The VOQ scheduler 244 can activate output ports that correspond to the virtual output queues. In addition, the VOQ scheduler 244 can receive output port selections, send selections of virtual output queues to the packet queue 204, and retire virtual output queues where a byte limit has been met and an EOP has been received for a data packet. The port scheduler 246 can schedule active output ports that are not presently suspended by the active port suspend 250. The active port transmit 248 can control a predetermined limit of the number of active output ports. The active port suspend 250 can suspend an output port if the virtual output queue associated with the output port meets a predetermined condition such as the virtual output queue becoming empty or substantially depleted of cells midway through dequeuing of a datapacket, or due to output delays that cause a restricted flow of cells out of the virtual output queue due to downstream bottlenecks or other forms of backpressure.

Packets received by the traffic management circuitry 200 can be dropped in various stages of processing of the incoming packet. For example, received packets can be dropped before being enqueued, during enqueuing and/or during dequeuing. Dropping of packets may occur anywhere in series of cells forming the packet, such as at SOP, anywhere in the middle of the packet (MOP), or anywhere in the sequence of cells up to the point an end of packet (EOP) is received and processed with the traffic management circuitry 200. A data packet can be dropped for any number of different reasons, such as due to corruption, or because the packet reaches a predetermined limit or threshold, such as reaching a threshold or limit in a buffer.

In the example of a data packet dropped before being enqueued, the packet can be dropped by the admission controller 206. In other examples, other parts of the traffic management circuitry 200 may indicate that a data packet should be dropped before being enqueued. A packet can be dropped any time before cells are initiated to be enqueued into the packet queue 204. The initiation of enqueing can also coincide with the storage of link list information in the link repair database 232 and storage of packet information in the packet information database 230. Thus, enqueing commences upon receipt and identification of an SOP of a data packet, as well as storage of linking information and packet information in the packet information database 230 and the link repair database 232. Prior to identification of SOP, and storage of linking information and packet information, a packet has not been enqueued.

Where a packet that has not yet been enqueued is identified as being dropped, the packet queue 204 can confirm to the enqueue pipeline 202, the pointer recycler 222 and the admission control 206 that a received data packet can be dropped by providing a packet drop confirmation message. The packet drop confirmation message may be output by the packet queue 204, on a drop confirmation line 240 that extends between the enqueue pipeline 202, the pointer recycler 222, and the admission control 206. In response to receipt of the packet drop confirmation message, the enqueue pipeline 202 can cease from accepting further cells for the data packet indicated as being dropped. In addition, enqueing of the data packet will not be initialized by the enqueue pipeline 202.

In an example where a data packet is identified as being dropped after the data packet has been enqueued, but before dequeuing has commenced, the packet queue 204 may provide the packet drop confirmation message on the drop confirmation line 240. In addition, the enqueue pipeline 202 can cease accepting cells for the dropped data packet. In this scenario, the data packet has already been enqueued, so packet information has been populated into the packet information database 230, and linking information has been populated into the link repair database 232. As described later, the link repair database 230 can be repaired using the packet linker 226 to remove the dropped data packet from the link list of packets in order to maintain the sequential linking of related data packets being received. In addition, the packet pointers of the dropped packet can be released by the pointer free pool 220 and recycled by the pointer recycler 222 for reuse in another data packet.

In another example where a data packet is identified as being dropped while the cells of the data packet are being dequeued, the traffic management circuitry 200 cannot simply drop the data packet since the data packet is being output, for example, to the fabric 104 in the case of the network device being a CIOQ switch, or out of the egress 106 in the case of a output queued switch. (FIG. 1) When a data packet that is being dequeued is identified as dropped, the current cell being stored in the packet queue 204 can be marked as the end of packet (EOP) by the enqueue pipeline 204, and a purge bit can be set in the EOP data packet to indicate the data packet is to be dropped. In addition, the remaining cells of the data packet not yet received at the traffic management circuitry 200 are not accepted by the enqueue pipeline 204. In the example of the network device being a CIOQ switch, the partial packet can be sent through the fabric 104 to the EMMU 106, where the EMMU 106 can drop the partial packet. In the example of the network device being an output queued switch, the output port, or the device receiving the partial packet, can be provided with drop instructions based on the purge bit being set.

Figure 3:
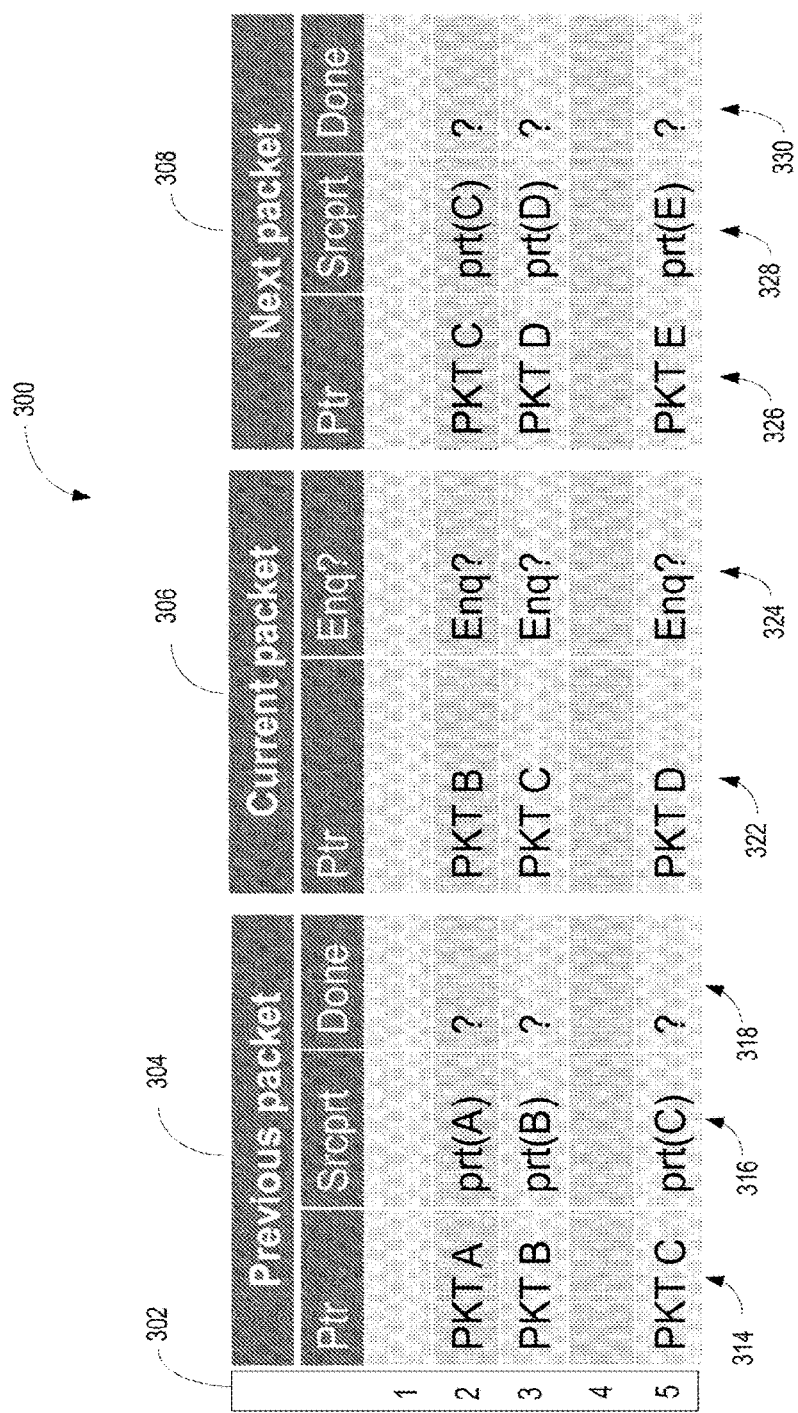
FIG. 3 is an example of memory included in an embodiment of the traffic management circuitry.

FIG. 3 is an example of a memory 300 included in an embodiment of traffic management circuitry 200. The memory 300 can be part of, and include information stored in the link repair database 232 of FIG. 2. Although illustrated in FIG. 3 in a table format, the information depicted is not limited to the format illustrated and could be in a relational database or any other format that associates the data as described. Each of the memory 300 can include a number of separate independent physical memories that can be read and written to by the traffic management circuitry 200. The information in each of multiple separate and independent memories 300 can be is associated using an index 302. In the illustrated example, the index 302 is in the form of a series of numbers, which can each represent a port, such as a source port in a network device upon which a current data packet is received. Thus, in the illustrated example, five source ports are illustrated, two of which are not presently receiving data packets. In this example embodiment, the link repair database 232 can be indexed using the source port number of current data packets B, C and D. In other example embodiments, other forms of indexing may be used to provide efficient data association.

In embodiments, the memory 300 can include a previous packet memory 304, a current packet memory 306, and a next packet memory 308 as separate and independent memories. Three separate and independent memories are illustrated in this embodiment in order to obtain bandwidth into and out of the traffic management circuitry so as to optimize independent reading and/or writing and/or modifying of information in parallel or possibly randomly at the same time into and/or or out of the memory 300. Other embodiments, where simultaneous read and/or write and/or modify performance can be achieved with a single memory, two independent memories, or more than three independent memories, in which latency is comparably minimized, are possible.

A sequence of related packets can be represented in the memories 300, and the number of different sequences can correspond to the number of ports. The previous packet memory 304 may include linking information related to a packet in a sequence of related packets which was previously received and enqueued in the packet queue 204. The previous packet memory may store pointer information (PTR) 314, source port information (Srcprt) 316, and done information 318. The pointer information 314 may identify each previous data packet for each respective port 302 by, for example, identifying a start of packet (SOP). The source port information 316 may identify the source port from where the identified previous packet is coming to the traffic management circuitry. The done information 318 may indicate whether a cell of the data packet containing an indication of an end of the packet (EOP) has been received. Thus, the done information indicates if a tail of the previously received packet has been fully received. The current packet memory 306 can include pointer information (PTR) 322 and enqueue status (ENQ?) 324 in the linking information for the current data packet. The pointer information 322 may identify each current data packet, and the enqueue status 324 can provide an indication of whether enqueuing of the current data packet has commenced. The next packet memory 308 can include pointer information (PTR) 326, source port information (Srcprt) 328, and done information 330. The pointer information 326 may identify each next data packet for each respective port 302, such as a start of packet (SOP) indicator. The source port information 328 may identify the source port from where the identified next packet is coming to the traffic management circuitry. The done information 330 may indicate whether an indication of an end of the packet (EOP) has been received in a cell of the next data packet.

Figure 4:
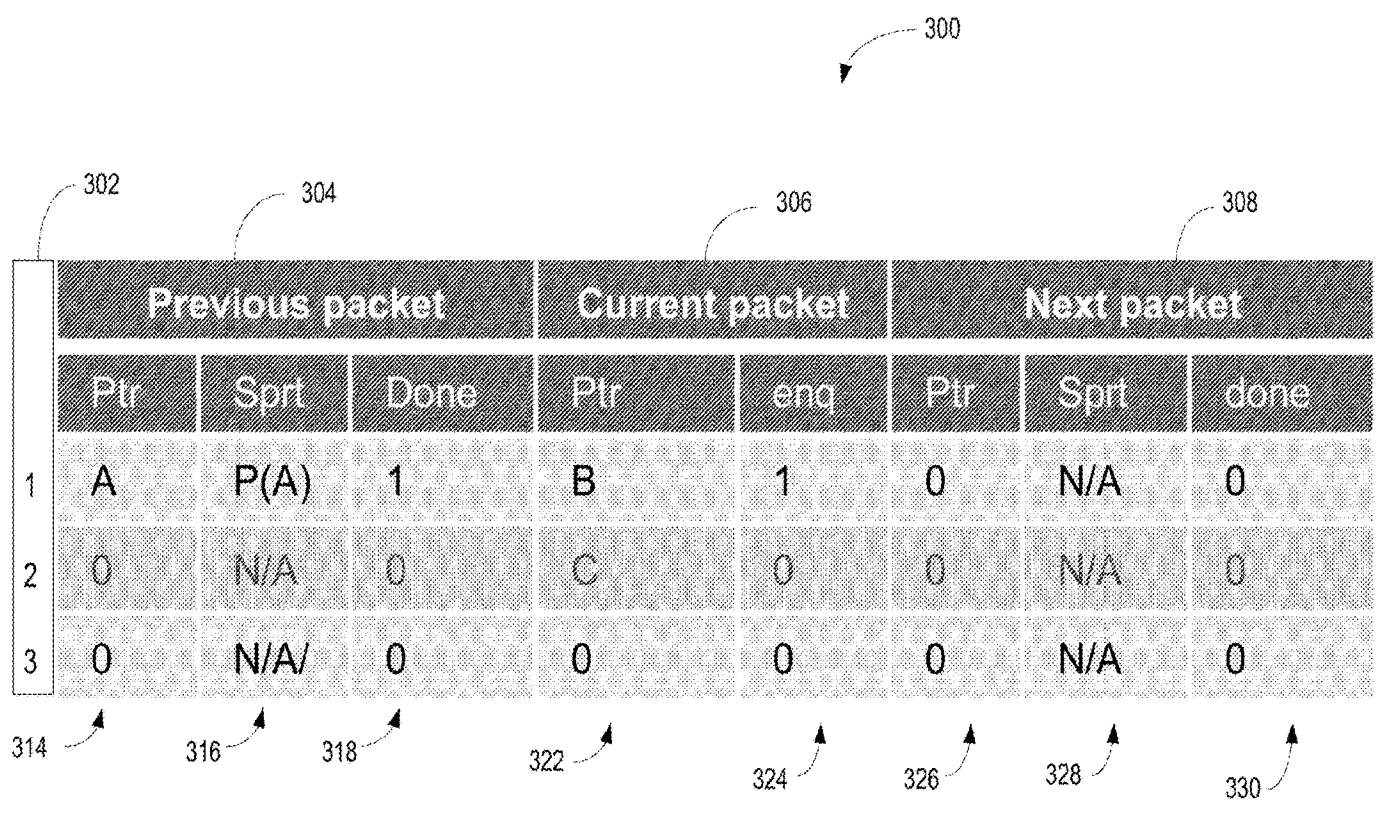

FIG. 4 is an example scenario to illustrate operation of an embodiment of traffic management circuitry regarding storage of information in the packet queue 204, which can include storage of linking information in the link repair database 232. Referring to the illustrated example and FIGS. 2-3, the data packet identified as C in FIG. 4 is a current packet, the data packets identified as B and A in FIG. 4 are previous packets, and data packets identified as D (not shown) are next data packets. During operation, when an SOP of the current data packet C arrives, the current packet memory 306 in the link repair database 232 is updated to store pointer information identifying the SOP of the C data packet, which, in an example, is indexed to the source port of the C data packet (identified as source port 2 in FIG. 4). In addition, a zero is stored in the enqueue status 324 to indicate that the C data packet is not yet ready for enqueuing, such as because a threshold condition has not been met. Also, packet information is read from the current data packet, for updating and/or comparing to the packet information stored in the packet information database 230. Further, portions of the previous packet memory 304 and the next packet memory 308 that are indexed to the current packet can be cleared or overwritten. For example, where the link repair database is indexed by source ports, and the current data packet C is received on source port two, the next packet memory 308 and the previous packet memory 304 which are indexed to source port two can be zeroed or cleared as illustrated. Since enqueuing of the current data packet C has not yet been initiated, there is no previous packet or next packet linking information to store in the memories 300.

FIG. 5 is an example scenario to illustrate further operation of an embodiment of the traffic management circuitry regarding storage of information in the packet queue 204 discussed with reference to FIG. 4, such as storage of linking information in the link repair database 232. In the illustrated example, a cell of the current data packet C is received and is ready for enqueuing since the administration controller 206 has initiated enqueuing of the current data packet C as indicated in the enqueuer status 324. Thus, in the illustrated example, the enqueue status 324 of the current data packet C is indicated with a one, and packet information from the current data packet C can be added to the packet information database 230.

The packet information database 230 can be read to identify, based on the indexing, a current tail (if any) of a previous data packet in the queue, which is associated with the current data packet C, and identify the current tail as a previous data packet B within the sequence of data packets that includes the current data packet C. If the tail packet of the previous data packet B is not yet fully received, as indicated in the packet information database 230, the source port identifier P(B) of the previous data packet B can be retrieved from the packet information database 230 and stored in the pointer information 316 for the previous packet. In addition, the link repair database 232 may be read to obtain pointer information for the current data packet C based on a previously enqueued SOP cell of the current data packet C, unless the received cell of the current data packet C includes an SOP indication, then no reading of the link repair database 232 needs to be performed.

The writes into the link repair database 232, may be indexed, such as with the source port of the current data packet C (source port two), as previously discussed. A first write can be into the current packet memory 306, and can include writing the pointer data 322 if the cell indicates an SOP, and writing the enqueue status 324 to set the enqueue status to indicate the data packet is linked into the virtual output queue of the packet queue 204. The first write can also be to the previous packet memory 304 where, for example, the previous data packet B has not been fully received. The first write to the previous packet memory 304 can include writing, for example, an SOP identifier of previous data packet B into the pointer information 314, writing a port source identifier into the source port information 316, and an indication that receipt of the previous data packet (B) is not done (a zero, for example) into the done information 318.

Indexing in the current packet memory 306 and the previous packet memory 304 can be at the same index 302 and therefore may constitute a single write (the first write) into the link repair database 232 at one index 302. A second write into the link repair database 232 can be into the next packet memory 308 at an index 302 that is independent of the index 302 of the previous packet memory 304 and the current packet memory 306. The second write may be made to reflect that previous data packet B now has a next packet. Thus, up to two independent writes to the link repair database 232 may be performed when a cell of the current data packet C is received since writes to the next packet memory 308 are independent from the writes to the current packet memory 306 and the previous packet memory 304.

Figure 6:
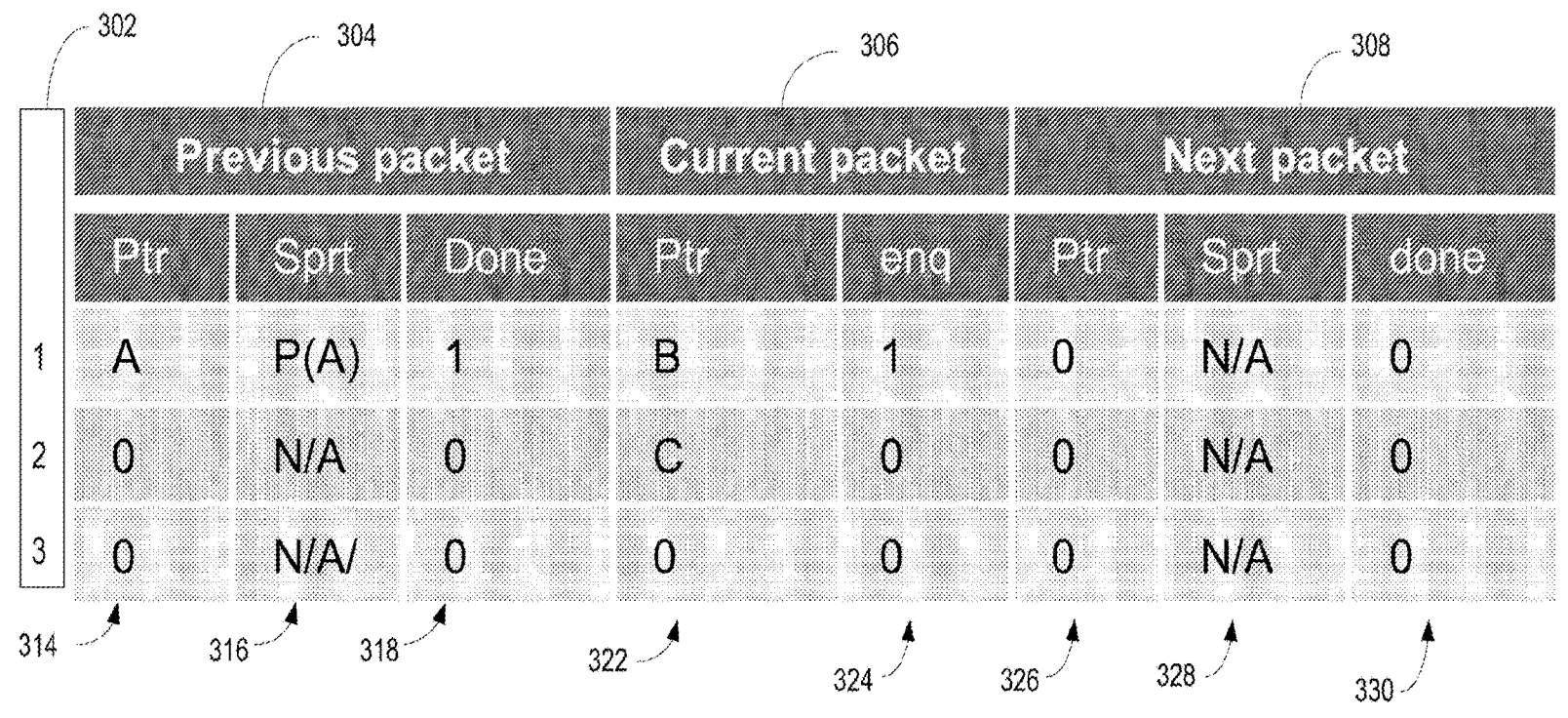

FIG. 6 is another example scenario to illustrate further operation of an embodiment of the traffic management circuitry regarding storage and management of information, such as linking information in the link repair database 232 discussed with reference to FIG. 4. In this example, scenario, a current data packet C that has been received but has not yet been enqueued is identified, such as by the admission controller 206, to be dropped. Since the current data packet C is not yet enqueued, as indicated by the zero present in the enqueue status 324 there is no linking information for a sequence of data packets that includes this data packet in the link repair database 206. Thus, no updates to the link repair database 232 are performed. Upon receipt of a SOP indication for another data packet to be enqueued that is similarly indexed, such as indexed to the source port (source port two) of the current data packet C, the indication of the current data packet C in the link repair database 232 can be cleared. Upon receipt of the drop message from the admission controller 206, the packet queue 204 may send a packet drop confirmation message on the drop confirmation line 240 to release pointers to the pointer recycler 22, reset the threshold count, and instruct the enqueue pipeline 202 to discard and/or not accept any cells received for dropped current packet C.

Figures 7A, 7B:
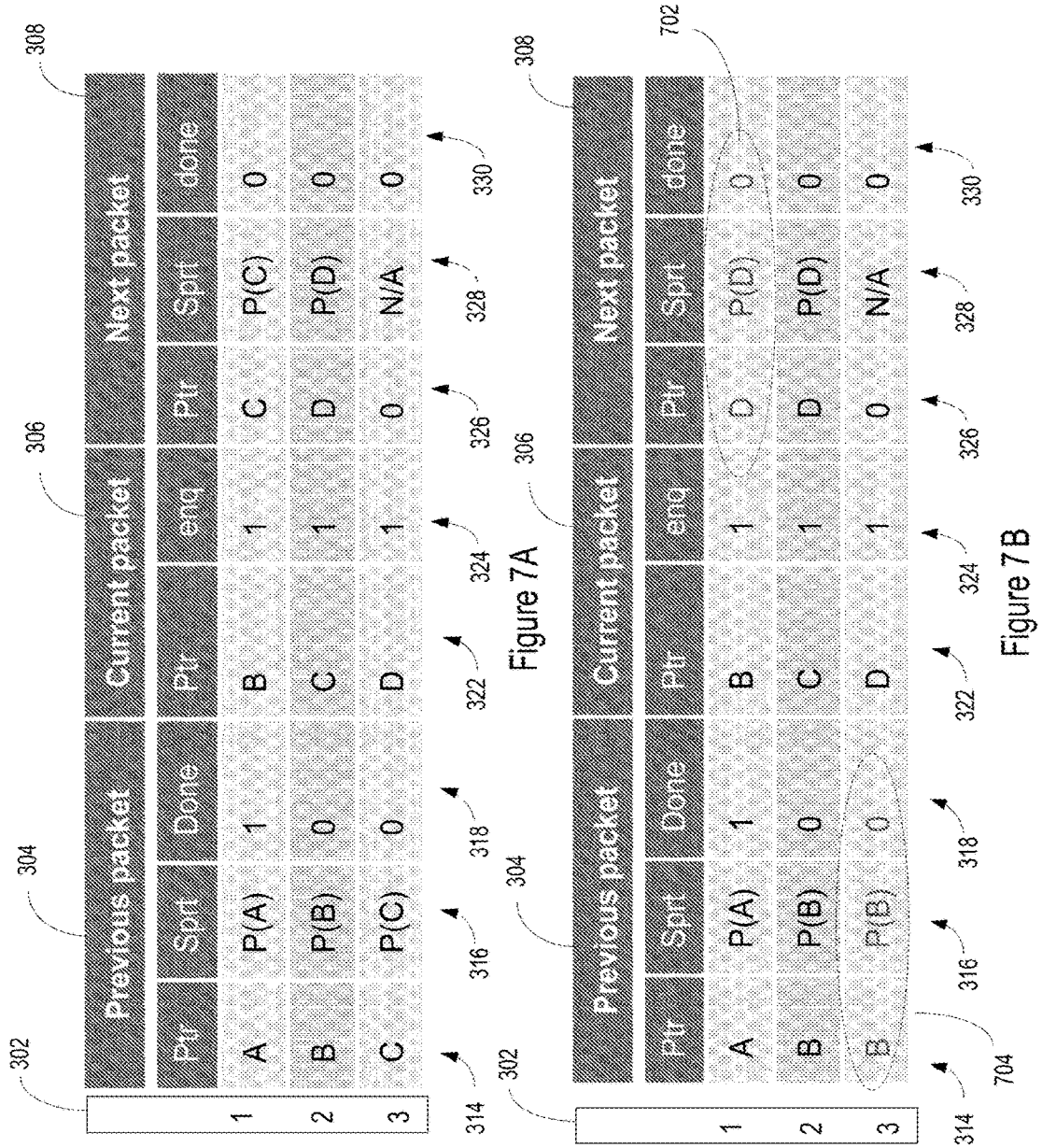
FIGS. 7A and 7B are another example scenario to illustrate further operation of an embodiment of the traffic management circuitry regarding storage and management of information.

FIGS. 7A and 7B are another example scenario to illustrate further operation of an embodiment of the traffic management circuitry regarding storage and management of information, such as linking information in the link repair database 232 discussed with reference to FIG. 4. In this example scenario, the admission controller 206 requests the current data packet C be dropped after data packet C is enqueued into the packet queue 204 by being linked into the virtual output queue, but before dequeuing of the current data packet C is initiated. Thus, some of the cells of the current data packet C have been received, including the SOP cell. There can be other packets queued up ahead of the current data packet C in the virtual output queue. Packets can be dequeued as the packets reach the head of the queue. In this case, however, current data packet C is dropped prior to reaching the head of the queue.

The packet queue 204 can read the link repair database 232 using the index 302 of the current data packet C (index=2), such as source port two of the current data packet C to retrieve previous packet information for previous packet B, as previously described, and retrieve next packet information for next data packet D. As illustrated in FIG. 7A, prior to receipt of the drop indication for the current data packet C, the information for the next data packet D can include the pointer data 326, such as the SOP of the next data packet D, and source port information 328, such as the source port from which the next data packet D was received, and done information 330 indicating whether a received cell of the next data packet included indication of EOP.

In FIG. 7A, with regard to the index 302 being addressed with source port one, data packet A sequentially precedes data packet B, and data packet C sequentially follows data packet B as the next packet. In addition, with regard to index 302 being addressed with source port two, data packet B sequentially precedes data packet C as the previous packet, and data packet D sequentially follows data packet C as the next packet. Also, with regard to the index 302 being addressed with source port three, data packet C sequentially precedes data packet D as the previous packet, and there is no data packet sequentially following data packet D as the next packet.

In this scenario, in order to drop the current data packet C, a repair to the link repair database 232 is performed to sequentially link the previous data packet B with the next data packet D for the index 302, since the previous data packet B is being actively received from source port one, and the next data packet D is being actively received from source port three as indicated by the done status 318 or 330 set to indicate that all cells of these enqueued data packets have not yet been received. If either previous data packet B or next data packet D had been completely received (a cell where EOP was received), then no repair would be necessary with respect to the completely received data packet since the data packet has been added to the queue, and is no longer an active location so there is no longer reliance on the linking information to maintain the sequence of data packets. Once current data packet C is identified by the admission controller 206 as being dropped, the packet queue determines the previous data packet and the next data packet based on the index 302, and repairs are effected for all indexes where the sequence includes current (dropped) data packet C sequenced with data packets that are not indicated by the done information 318 and 330 as completely received.

FIG. 7B illustrates the sequences of the indexes 302 in the memories 300 after the repair is completed. Specifically, with regard to the data packets indexed with source port one, in the next packet memory 308, the current data packet C is replaced by the next packet of data packet C, which is data packet D, as illustrated by the dotted oval 702. In addition, in the previous memory 304, the current data packet C is replaced by the previous packet of C, which is data packet B, as illustrated by the dotted oval 704. In the case where dropped current data packet C is the tail in a sequence of data packets, than a zero can be written in the next packet memory 308 as the next pointer data when the repair is made. Also, in the case where dropped current data packet C is the head of a sequence of data packets, then a zero can be written in the previous packet memory 304 as the next pointer data when the repair is made.

The packet information database 230 may also be selectively updated such that if the current data packet C is the tail of a sequence of data packets, the previous data packet B is identified in the packet information database 230 as being the new tail when current data packet C is dropped. If the current data packet C is neither the head nor the tail of a sequence of data packets, updating of the packet information database may not be necessary. In addition, if the current data packet C is the only data packet in the virtual output queue when the current data packet C is dropped, an empty indication can be sent to the packet scheduler 236. The packet linker 226 can also be repaired with a single write to link the data packet D to the data packet B. The packet queue 204 may also transmit a confirmation of drop as previously discussed.

In another example scenario, the admission controller 206 can request the current data packet C be dropped after data packet C is enqueued into the packet queue 204 by being linked into the virtual output queue, and after dequeuing of the current data packet C is initiated. Thus, some of the cells of the current data packet C have been received, including the SOP cell, and, dequeuing has commenced since current data packet C has reached the head of virtual output queue.

In this scenario, the packet information database 230 can be read to indicate that the data packet to be dropped has started to dequeue. Since the data packet has begun dequeuing, the enqueued cells of the data packet presently in the packet queue 204 should not be dropped, and instead the already enqueued cells can be allowed to finish dequeuing. The enqueue pipeline 202 may truncate the data packet by not accepting any additional cells, and instead discard all additional cells received for the dropped data packet. In addition the enqueue pipeline 202 can add an EOP indication to the last cell in the portion of the cell sequence that was not truncated. Further, the enqueue pipeline 202 can set the purge bit with the cell linker 224 in the last cell of the dropped data packet that was not truncated. The truncated data packet can be processed as a complete packet by the packet queue 204. Since the data packet is not actually dropped in the traffic management circuitry, the packet queue 204 need not send a drop confirmation message, and therefore the pointers for the dropped data packet are not released, and the thresholds for dequeuing is not reduced. In an example where the network device is a network switch, and more specifically a CIOQ switch, the truncated data packet sent to the egress can be dropped by the egress upon receipt.

FIG. 8 is another example scenario to illustrate further operation of an embodiment of the traffic management circuitry regarding storage and management of information, such as linking information in the link repair database 232 discussed with reference to FIG. 4. In this example scenario, the packet cell that indicates end of packet EOP is received. Upon identifying the EOP has been received for a current data packet C, the link repair database 232 may be read to get previously received data packet B and the next data packet D information based on the indexing. In addition, in the link repair database 232, the previous data packet can be updated to reflect that the current data packet C is done in other indexed locations such as in source port one of the done information 330 in the next packet memory 308, and in the source port three of the done information 318 in the previous packet memory 304, as indicated by dotted circles in FIG. 8. The completed current data packet entry C indexed to the second source port can be overwritten by new information the next time an SOP of another data packet is indexed as being received from the second source port. If the current data packet C is the tail of a related sequence of data packets, then the packet information database 230 can also be updated to reflect that the current data packet C related sequence of data packets have been fully received.

Figure 9:
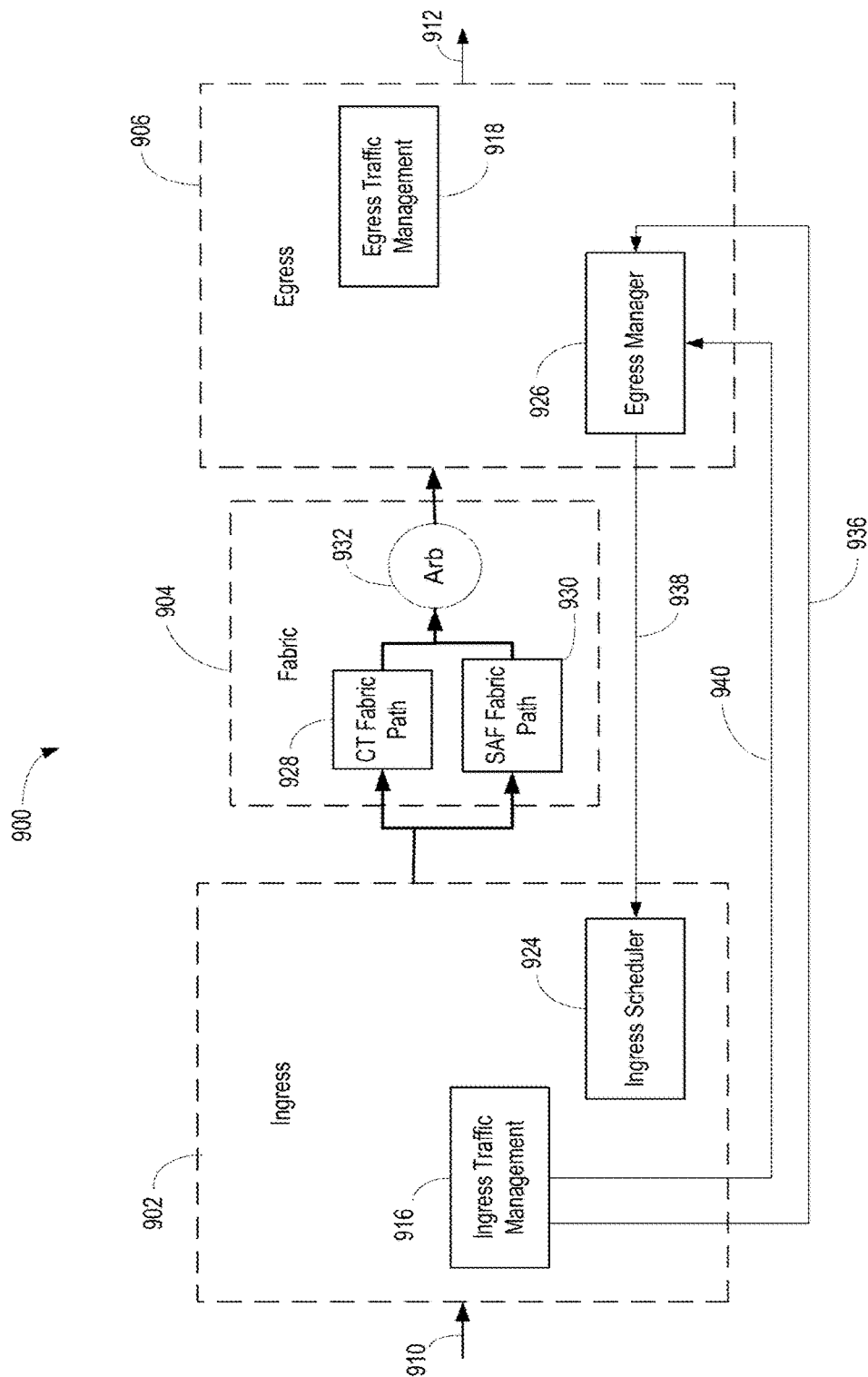
FIG. 9 is a block diagram of an example embodiment of a network device in the form of a network switch.

FIG. 9 is a block diagram of an example embodiment of a network device 900 in the form of a network switch. The network switch 900 can be a CIOQ switch with circuitry that includes at least one ingress (IMMU) 902, a fabric (IFI) 904 and at least one egress (EMMU) 906. In this embodiment the network device 900 can operate with cut-through and store-and-forward to receive data packets at an input 910 of the network device 900, and output data packets at an output 912 of the network device 900. Data packets can be received by the network device 900 from a network or another network device, and be output to a network or another network device.

Latency of processing data packets between the input 910 and the output 912 within the network device 900 can be minimized by bypassing buffering using cut-through in the ingress 902 and/or the egress 906. In this example embodiment, the ingress 902 can include traffic management circuitry 916, and the egress can include egress traffic management circuitry 918. Accordingly, using the ingress traffic management circuitry 916, the network device 900 can operate using cut-through and store-and forward, as well as the previously discussed early queueing in the ingress 902 by enqueuing cells of a data packet before the data packet is completely received at the input 910, and also dequeuing the data packet into the fabric 904 before the data packet is completely received at the input 910. In addition or alternatively, cut-through and store-and-forward with early queueing can be performed in the egress 906 with the egress traffic management circuitry 918 by enqueuing cells of a data packet before the data packet is completely received by the egress 906 from the fabric 904, and also dequeuing the data packet to the output 912 before the data packet is completely received from the fabric 904.

As previously discussed, a cut-through or a store-and-forward data packet can be dropped 1) prior to enqueue in the ingress 902 or the egress 906; or 2) after enqueue but before dequeue in the ingress 902 or the egress 906; or 3) after enqueue and after dequeue has commenced in the ingress 902 or the egress 906. When a cut-through data packet or a store-and-forward data packet is dropped by the network device 900 under any of these three conditions, the ingress 902 and/or the egress 906 can perform repairs in the sequence of data packets using the respective traffic management circuitry 916 or 918, as previously described.

In the network device 900 cut-through with early queuing can be performed by the ingress 902, and store-and-forward can be performed at the egress 906 to minimize latency. In other embodiments, to further minimize latency, cut-through with early queuing can also (or alternatively) be performed in the egress 906 so long as a data packet that is early queued at the egress is fully received from the fabric 904, or at least received at a rate that is the same or faster than the dequeue rate of the egress 906. Thus, in order for data packets to cut through the egress 906, a data packet subject to cut through in the ingress can be granted a minimum amount of bandwidth guarantee through the fabric 904.

To guarantee that a data packet being subject to early queuing and cut-through in the egress is timely received in the egress 906, the ingress 902 can include an ingress scheduler 924 and the egress 906 can include an egress manager 926. The ingress scheduler 924 and the egress manager 926 can cooperatively operate in conjunction with the early queuing being performed to avoid congestion in the fabric 904 as the cut-through data packets are processed through the network device 900. In this example, a data packet can cut-through the ingress 902 without permission from the egress 906. Instead, a fabric guarantee can be established in the ingress 902 that provides higher priority for cut-through data packets than for store-and-forward data packets in the fabric 904.

This fabric guarantee ensures availability of the cells of a data packet being received from the fabric 904, for early enqueuing and cut-through processing in the egress 906. Early enqueuing in the egress 906 can be initiated based on a predetermined condition such as a threshold to absorb jitter and/or avoid other issues related to the virtual queue being depleted of cells of a data packet being early enqueued, as previously discussed. Since the cut-through data packets and the store-and-forward data packets use the same queue in the ingress 902, the packet scheduler included in the egress traffic management circuitry 918 does not have to differentiate between cut-through and store-and-forward data packets in making early queuing decisions. Instead the packet scheduler can identify cut-through data packets in the ingress 902 that have the fabric guarantee as eligible for cut-through in the egress 906. Since the egress packet scheduler included in the egress traffic management circuitry 918 is responsible for dequeuing from the egress traffic management circuitry 918, the egress manager 926 can have both store-and-forward queues and cut-through queues. The egress packet scheduler, however, does not have to differentiate between the store-and-forward queues and cut-through queues because the cells of the packets which are dequeued by the packet scheduler from the store-and-forward queues and cut-through queues will appear identical.

The fabric guarantee can be established by the packet scheduler included in the ingress traffic management circuitry 916. Thus, a data packet that does not get the fabric guarantee (not subject to cut-through in the egress) goes to store-and-forward processing at the egress 906, whereas a cut-through data packet where a fabric guarantee can be established at the ingress 902 can go to cut-through processing at the egress 906. In FIG. 9, the fabric 904 is depicted to include a cut-through fabric path 928 and a store-and-forward fabric path 930, which are managed with a fabric arbiter 932 to avoid congestion in the fabric 904 and thereby provide the fabric guarantee that a data packet subject to cut-through in the egress will not be cut off or otherwise "get stuck" in the fabric 904. Thus, the fabric arbiter 932 operates to confirm that higher priority will be given to cut-through data packets in the fabric 904 that can also be subject to cut-through processing at the egress 906.

The fabric guarantee for a data packet may be established by a communication protocol between the ingress 902 and the egress 906. The communication protocol can include a request from the ingress traffic management circuitry 916 on a port request line 936. The request can be a request for prioritized communication in the fabric of a data packet between the ingress 902 and the egress 906. Initiation of a request on the port request line 936 may be triggered by receipt in the ingress 902 of the SOP of a data packet. The request can include a reservation request to reserve an output port in the egress 906 for a particular data packet. In an embodiment, the request can include a port number of an output port in the egress 906 and an identifier of the particular data packet. The request can be generated before starting checks with the admission controller 206 for admission of the data packet to the packet queue 204 to minimize latency by avoiding performing admission checks for those data packets that are determined to be ineligible for enqueuing in the packet queue 204. In response to the request, the egress manager 926 can send a response to the ingress port 902.

In embodiments, the response may be a grant message, a reject message, or a revoke message. The response can also include the port number of the output port in the egress 906, which was included in the request and can be used to output the particular data packet, when the response is a grant message. If the response is a grant message, an active state can be created in the data port of the egress 906 indicated in the response message. Upon the ingress traffic management circuitry 916 receiving a cell that includes an EOP indication and is also a cell of the particular data packet subject to the fabric guarantee, the ingress traffic management circuitry 916 can transmit a done message that includes the output port number, on a done line 940.

Figure 10:
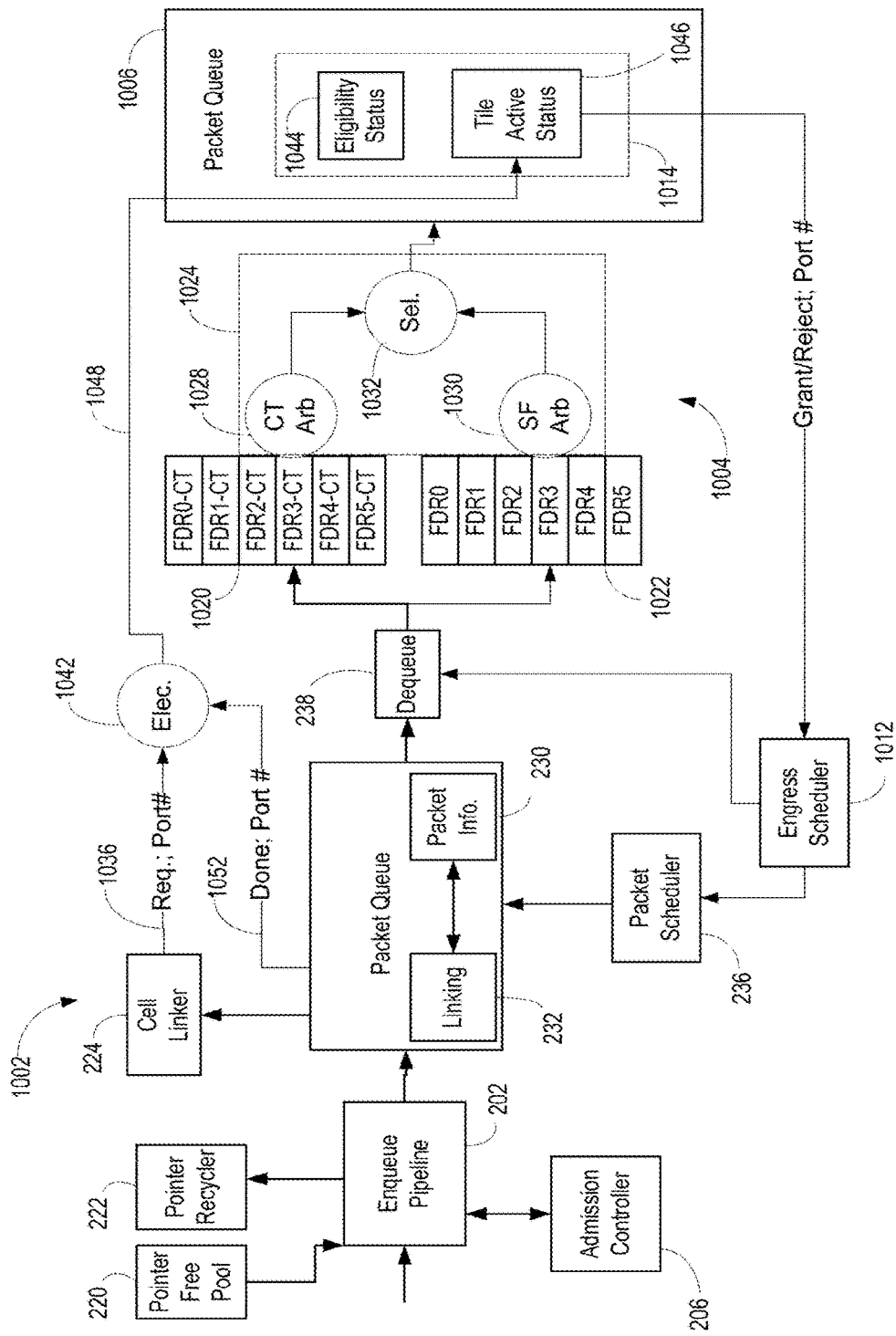
FIG. 10 is a block diagram of an example embodiment of a network device that includes an ingress, a fabric, and an egress, where a portion of ingress traffic management circuitry, an ingress scheduler in the ingress, and an egress manager in the egress is illustrated.

FIG. 10 is a block diagram of an example embodiment of a network device 1000, such as a network switch, that includes an ingress 1002, a fabric 1004, and an egress 1006. Also illustrated in FIG. 10 is a portion of an ingress traffic management circuitry, an ingress scheduler 1012 in the ingress 1002, and an egress manager 1014 in the egress 1006. The fabric 1004, includes an illustration of a number of cut-through virtual channels 1020 (FDR0-CT-FDR5-CT) and a number of store-and-forward virtual channels 1022 (FDR0-FDR5), which are selectively used for transporting data packets through the fabric 1004, as determined by an arbiter 1024, to the egress 1006. The arbiter 1024 of this embodiment includes a weighted cut-through (CT) arbiter 1028 for the cut-through virtual channels 1020, and a weighted store-and-forward (SF) arbiter 1030 for the store-and-forward virtual channels 1022, each of which are multiplexed or otherwise sequenced based on a weighting to provide transport thru the fabric 1004 of cut-through data packets and store-and-forward data packets. The arbiter 1024 also includes a selector 1032 that performs weighted selection of either the CT egress port arbiter 1024 or the SF egress port arbiter 1030, such as a weighted round robin scheduling discipline, which is based on the status of cut-through data packets, in order to share use of the fabric 1006 between the cut-through data packets and the store-and-forward data packets while still maintaining the fabric guarantee for those cut-through data packets that are designated. Operation of the CT arbiter 1024 and/or the SF arbiter 1030 can be a weighted round robin scheduling discipline that serves the respective identified egress ports.

In FIG. 10, when the enqueue pipeline 202 in the ingress traffic management circuitry identifies a SOP cell and begins enqueuing a data packet, a request can be sent over the request line 1036 to establish a fabric guarantee for the received data packet. The request is for prioritized access to the fabric for that packet. The request can be generated for an SOP cell of a received data packet when the state of the ingress traffic management circuitry is in condition to perform cut-through operation for the received data packet. Such requests are generated before starting admission eligibility checks for received data packets, which reduces overall latency. Thus, requests are only generated and sent for those data packets that are eligible for cut-through processing in the ingress 1002 and are subject to early enqueuing in the ingress 1002. Examples of being in condition to perform cut-through include the absence of a flag or other condition that forecloses the application of cut-through to the received data packet, cell pointers being available from the pointer free pool 220 (FIG. 2), the virtual output queue not being empty, and/or any other checks/confirmations to determine that cut-through processing with early enqueuing is available in the ingress 1002 for the received data packet.

The request generated by the enqueue pipeline 202 may include an egress port number of an output port in the egress 1006. The ingress scheduler 1012 can maintain a cut-through state of each egress port in the egress 1006. The cut through states may be used only by the ingress scheduler in order to provide higher fabric priority for the packets being dequeued from the ingress 1002. The request may be provided to the election circuitry 1042, where it is forwarded to the egress manager 1014 on an output port control line 1048.

The request is received by election circuitry 1042, which can pass the request directly to the egress manager 1014. The egress manager 1014 can include a cut-through eligibility status 1044 that maintains an eligibility state of each egress port in the egress 1006, and a tile active status 1046 that maintains the status of each active tile in the ingress 1002.

Using the cut-through eligibility status 1044, the egress manager 1014 can determine whether the egress 1006 can provide cut-through support of the data packet. The determination may include checking the packet flow control (PFC) and disallowing cut-through if any condition of service of the requested output port is flow controlled; and/or confirming the requested output port is not paused; and/or confirming that the egress port is not above a threshold, such as an output threshold in which too many cells of cut-through data packets are building up in the output port; and/or checking any other conditions or parameters of the egress 1006 that could impact cut-through operation on the data packet upon receipt from the fabric 1004 in the egress 1006.

The tile active status 1046 may be set when a request that includes the egress port number is received, and may be cleared upon receipt from the corresponding ingress tile of a done message that includes the egress port number. When set, the tile active status 1046 may indicate that an ingress tile in the packet queue 204 of the ingress 1002 has one or more data packets that are for cut-through in the corresponding egress output port in the egress 1006. Setting of the tile active status may, for example, be a bit which is set when predetermined conditions are met. Example predetermined conditions include that the output port included in the request is "wired" as an output port capable of cut-through processing of data packets, and/or that only one ingress tile has requested, or is requesting, the output port for cut-through processing, since, in some embodiments, an egress port is cut-through eligible only if not more than one ingress tile at a time indicates that there are data packets for the particular egress output port.

The egress manager 1014 can generate a response message which is a grant of the request, if the egress port is eligible for cut-through processing of the data packet, and if there is only one ingress tile with one or more cut-through data packets for the identified egress port. The response message can be transmitted from the egress manager 1014 to the ingress scheduler 1012 on a response line 1050. The egress manager 1014 can also generate a response message that is a reject message in the case when the predetermined conditions, such as eligibility and tile active status are not met. A revoke message can also be generated by the egress manager 1014 as the response message. The revoke message reverses a previously generated grant message, and can be generated, for example, when an egress port that was determined to be eligible for cut-through processing of a data packet becomes in eligible. In this scenario, if the cut-through of the data packet in the egress 1006 has already began, than the cut-through may be finished gracefully, however, any additional packets in the sequence may be disallowed from cut-through in the egress 1006, and instead can be switched to store-and-forward processing in the egress 1006.

The ingress scheduler 1012 can maintain, in the ingress 1002, the cut-through state of the output ports in the egress 1006 based on the response messages. Thus, upon receipt of a grant message from the egress manager 1014, the ingress scheduler 1012 may identify the port number of the egress output port capable of providing cut through for a data packet. Based on this identification, the packet scheduler 236 may schedule such an egress output port with higher priority over egress output ports that are not identified as cut-through eligible ports. In addition, a cut-through qualifier may be stamped on those cells that are going into the fabric 1004 destined for an egress output port identified as capable of providing cut-through.

When an egress output port becomes empty of the cells of a data packet being provided cut-through processing, the cut-through state of the egress output port in the ingress 1002 can be cleared by the ingress scheduler 1012. Similarly, when the ingress scheduler 1012 receives a response that is a reject message or a revoke message, the cut-through state of the egress output port can be cleared. A done message may also be generated and sent over a done line 1052 to the election circuitry 1042, and then on to the egress manager 1014 via the egress output port control line 1048 to clear the tile active status 1046. In addition, the cut-through state of an egress output port can also be cleared in the ingress 1002 by transmission of a grant response message over the response line 1050 when the egress output port identified in the response message is empty, such as due to a dropped data packet.

Fabric guarantees by prioritizing the cut-through egress output ports using the cut-through state of the egress output ports can be provided in the network device 1000, while egress credit scheduler (ECS) credit accounting for virtual output queues can still be maintained. In general, ECS credit scheduling is used in a CTOQ switch to provide available bandwidth in the fabric 1004 for cut-through of data packets based on the operation of virtual output queues that correspond to the output ports in the egress 1006. The more congested the virtual output queues become, the fewer credits are provided to the packet scheduler 236 in the ingress 1002. In embodiments, ECS credits for a virtual output queue can go negative at the packet scheduler 236 to a predetermined threshold. If ECS credits for a virtual output queue go below the predetermined threshold, than that virtual output queue may be determined by the packet scheduler 236 as no longer cut-through eligible. In the case where no virtual output queue is cut-through eligible for an egress output port, than that egress output port is determined by the packet scheduler 236 to be ineligible for providing cut-through. Upon at least one corresponding virtual output queue receiving sufficient ECS credits at the packet scheduler 236, the egress output port may again be considered eligible to provide cut-through, and therefore eligible for fabric guarantees. In the case where multiple virtual output queues are eligible to provide cut-through for a specific egress output port, then arbitration may be used by the packet scheduler 236 to retire virtual output queues with fewer ECS credits so that the virtual output queue with the highest number of ECS credits remains to provide cut-through in connection with the corresponding egress output port.

The fabric 1004 can be a switched fabric network, such as fourteen data rate (FDR), that can be divided into a series of partitions forming virtual channel fabric buffers, where each partition can having a data rate. In embodiments, each of the partitions in the series that form a virtual channel fabric buffer can correspond to an egress port in the egress 1006 and support a single virtual channel capable of a predetermined data communication speed through the fabric using a predetermined number of bytes. Cut-through data packets and store-and-forward data packets may be represented by the partitions in the same series of partitions. The location in the series of partitions of each cut-through data packet and each store-and-forward data packet can be representative of ordering of the respective data packets. Accordingly, the order of the cut-through data packets and the store-and-forward data packets in the virtual channel fabric buffers can be maintained by the partition locations in the virtual channel fabric buffers.

Figure 11:
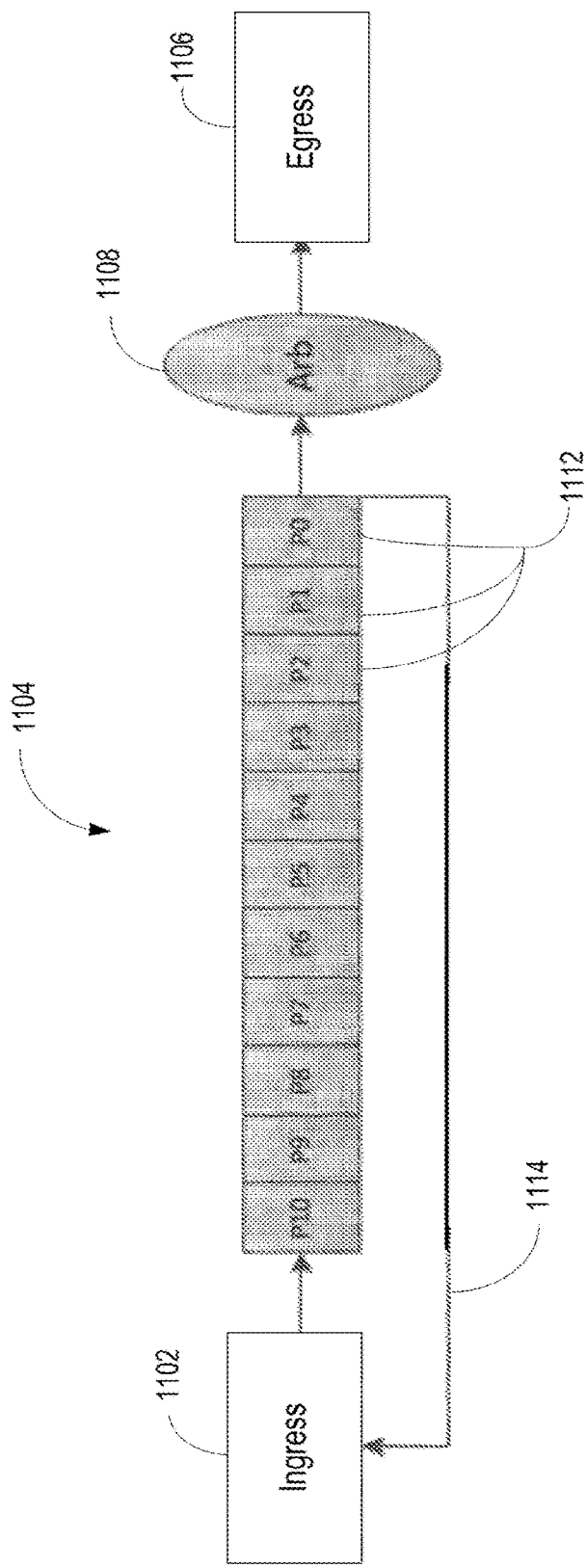
FIG. 11 is a block diagram of an example embodiment of a network device illustrating an ingress, a fabric, and an egress, in which the fabric is depicted as including an arbiter, and a virtual channel fabric buffer formed with a series of partitions representative of output ports of the egress.

FIG. 11 is a block diagram of an example embodiment of a network device 1100 illustrating an ingress 1102, a fabric 1104, and an egress 1106, in which the fabric is depicted as including an arbiter 1108, and a virtual channel fabric buffer 1110 formed with a series of partitions 1112 representative of output ports of the egress 1106. The arbiter 1108 operates to arbitrate among the different partitions to select partition locations, and corresponding virtual channels (1020 and 1022—FIG. 10), for cut-through and store-and-forward data packets at the egress 1102 as the different data packets are received and enqueued, and egress output ports are requested and granted to set up fabric guarantees for at least some of the data packets subject to cut-through in the ingress. In the example of FIG. 11, the virtual channel fabric buffer 1110 is formed to include eleven partitions (P0-P10) 1112, which are each representative of, and correspond to, one egress output port. Thus, in this example, each egress 1106 supports eleven egress output ports. In other examples the number of partitions 1112 in the virtual channel fabric buffer 1110 can be less than or greater than eleven in accordance with the configuration of the egress output ports. In addition, a network device may have multiple ingress and egress, with each egress having multiple output ports. Thus, each different egress may be represented with a different virtual channel fabric buffer 1110, resulting in a number of virtual channel fabric buffers 1110 being present in the fabric 1104 of a network device 1100.

The virtual channel fabric buffer 1110 may be in the form of circular first-in first-out (FIFO) data buffer included in the fabric 1104. In this embodiment, each partition 1112 can support one corresponding cut-through or store-and-forward virtual channel (1020 and 1022—FIG. 10) in the fabric 1104. In an example embodiment, each virtual channel can be capable of transporting up to 145 bytes at up to 100G. Each of the egress cut-through data packets and store-and-forward data packets may be represented among the partitions 1112. Cut-through data packets and store-and-forward data packets can be sent to the same virtual channel fabric buffer 1110. Accordingly, the virtual channel fabric buffer 1110 could have both cut-through data packets and store-and-forward data packets co-existing in a determined order in the virtual channel fabric buffer 1110. Since the virtual channel fabric buffer 1110 is circular, the order of reading out of cut-through data packets and store-and-forward data packets can be maintained in the virtual channel fabric buffer 1110, such that the cut-through data packets do not overtake the store-and-forward data packets.

The fabric 1104 may still provide ECS credits for each of the partitions 1112 back to the ingress 1102 as per partition credit returns 1114. The ECS credits may be used by the packet scheduler in the ingress 1102 to determine to which egress output port a data packet (either cut-through or store-and-forward) should be sent. Since both the cut-through data packets and the store-and-forward data packets are in the same queue, once a request and port number are sent and a grant message is received, the partition 1112 corresponding to the port number in the request/grant messages can be filled with the data packet. In an example embodiment, the cells from the cut-through data packets and the store-and-forward data packets are only sent if ECS credits are available for a particular partition 1112. It is the ingress 1102 which is responsible for selecting and sending cells to a partition 1112.

Figure 12:
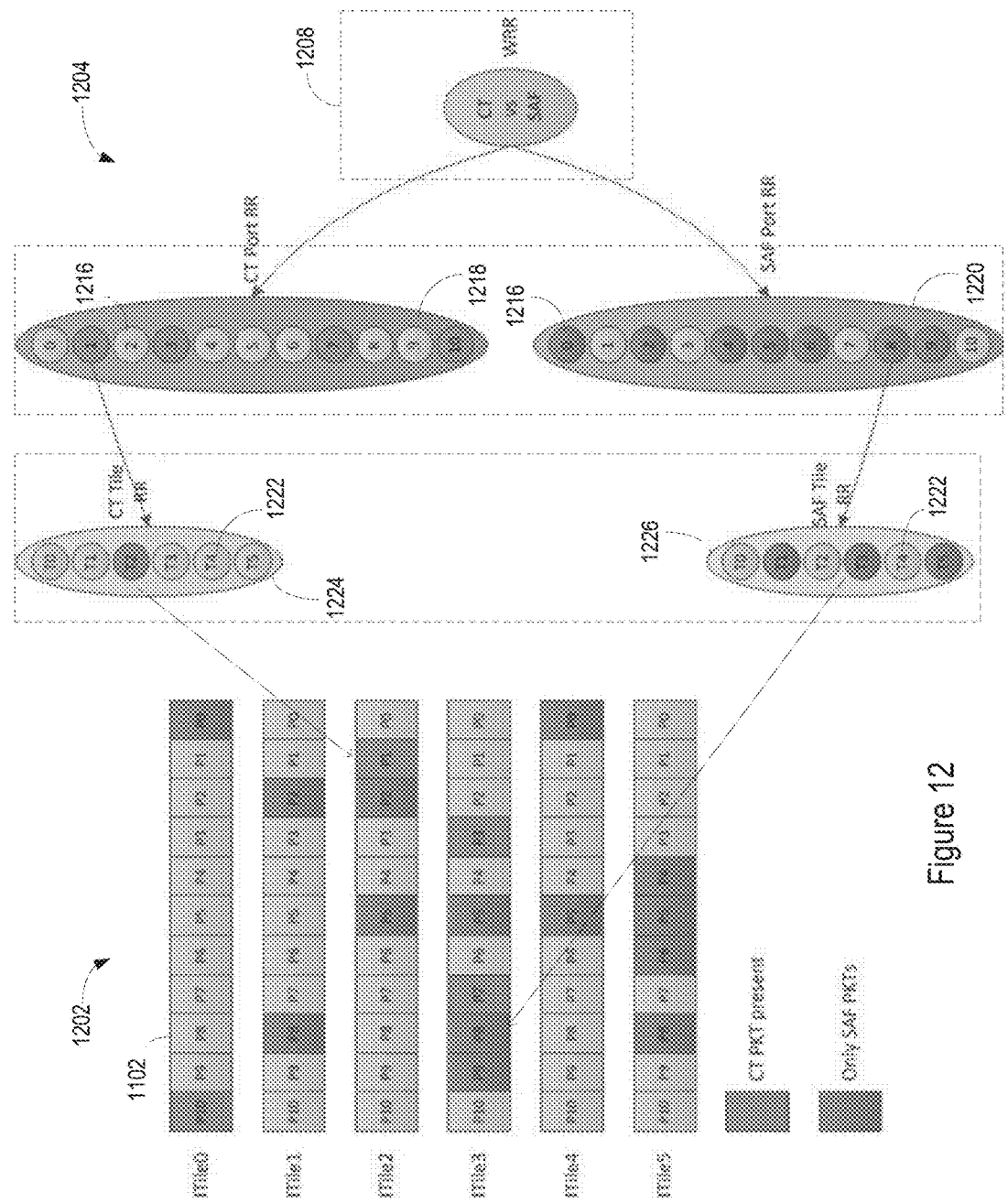
FIG. 12 is a schematic diagram illustrating an embodiment of a dynamic virtual channel arbiter using virtual channel fabric buffers illustrated in FIG. 11.

FIG. 12 is a schematic diagram illustrating an embodiment of dynamic virtual channel arbitration using virtual channel fabric buffers as illustrated in FIG. 11. In the example of FIG. 12, six virtual channel fabric buffers 1202 are depicted for each of six ingress tiles (ITile0-ITile5). In addition, an arbiter 1204 is depicted. In this example, the arbiter 1204 is a three level arbiter that includes a first level which is a mode level 1208 in which arbitration occurs between store-and-forward data packets and between cut-through data packets, a second level which is a port level 1210 in which arbitration occurs between nodes which represent output ports for cut-through and output ports for store-and-forward in an egress, and a third level which is a tile level 1212 in which arbitration occurs between physical ports in tiles associated with each of the respective nodes of the output ports in the port level 1210.

In the example of FIG. 12, eleven port nodes 1216 are included in each of at least one cut-through port 1218 and at least one store-and-forward port 1220. In addition, six physical ports represented with six tile nodes 1222 are included in each of a plurality of cut-through tiles 1224 and store-and-forward tiles 1226. Each port node 1216 in the at least one cut-through port 1218 and the at least one store-and-forward port 1220 is associated with a respective cut-through tile 1224 and a store-and-forward tile 1226. Accordingly, each port node 1216 in the egress is associated with six tile nodes 1222. In other examples, additional or fewer arbiter levels may be used, and fewer or additional port nodes 1216, ports 1218 and 1220, tile nodes 1222, and/or tiles 1224 and 1226 may be used in accordance with the configuration of the network device.

Data packets that are identified for cut-through are enqueued at the ingress based upon a predetermined condition and can be granted a fabric guarantee as previously discussed. The packet scheduler in the egress does not differentiate between the cut-through data packets and store-and-forward data packets when scheduling data packets to be sent out. Instead, the data packets are identified as cut-through or store-and-forward, and the arbiter 1204 can use this information to perform virtual channel arbitration to communicate the data packets through the fabric using the corresponding virtual channels. In the first level 1208, each cell of a data packet that arrives at the fabric indicates it is either part of a cut-through data packet or a store-and-forward data packet. The cut-through tile 1224 and the store-and-forward tile 1226 can be activated in response to the respective arrivals. There can be multiple active tile nodes 1222 for each egress output port, for example, in FIG. 12, node T2 of the cut-through tile 1224, and nodes T1, T3, and T5 in the store-and-forward tile 1226 are illustrated as active.

Each of the cut-through tile 1224 and the store-and-forward tile 1226 can include multiple active tile nodes 1222 in accordance with the cut-through and store-and-forward data packets that are presently being processed through the fabric. In the example of FIG. 12, the virtual channel fabric buffer 1202 representing ingress tile 2 (ITile2) includes a cut through data packet represented in partition P1, which corresponds to an egress output port, and which activates corresponding tile node T2 1222 in cut-through tile 1224. Upon becoming active, cut-through tile 1224 activates port node one 1216 in the cut-through port 1218. The activation of port nodes in the cut-through port 1218 indicates what tiles are requesting cut-through at the port level 1210, some of which may include the fabric guarantee. In the example of FIG. 11, within the virtual channel fabric buffers 1202, ingress tile 3—P3 and P7; and ingress tile 1—P10; are also indicated as having cut through data packets present, resulting in corresponding port nodes three, seven and ten in the cut-through port 1218 being activated at the port level 1210. Based on the number of port nodes 1216 that are presently active at the port level, the mode level 1208 can determine how much bandwidth of the fabric to allocate to cut-through by arbitration among the port nodes 1216. As the cut-through data packets are completed (Done) the tiles are deactivated, and the port nodes 1216 are correspondingly deactivated. Tile arbitration can be performed in a predefined manner, such as a round robin sequence, however, when only one tile is active, such as in the present example, no arbitration is needed.

With regard data packets that are identified for store-and-forward, in the example of FIG. 12, the virtual channel fabric buffer 1202 representing ingress tile 3 (ITile3) includes a store-and-forward data packet represented in partition P5, P8, and P5, which correspond to multiple egress output ports, and which activate corresponding tile node T3 1222 in store-and-forward tile 1226. Upon becoming active, store-and-forward tile 1226 activates port node five, eight, and nine 1216 in the store-and-forward port 1220. The activation of port nodes in the store-and-forward port 1220 indicates what tiles are requesting store-and-forward at the port level 1210. In the example of FIG. 11, within the virtual channel fabric buffers 1202, ingress tiles 0-2 and 4-5—P0, P2, P4, P6 and P7 are also indicated as having store-and-forward data packets present, resulting in corresponding port nodes zero, two, four-six and eight-nine in the store-and-forward port 1220 being activated at the port level 1210. Based on the number of port nodes 1216 that are presently active at the port level, the mode level 1208 can determine how much bandwidth of the fabric to allocate to store-and-forward by arbitration among the port nodes 1216. As the store-and-forward data packets are completed the tiles are deactivated, and the port nodes 1216 are correspondingly deactivated. Tile arbitration can be performed in a predefined manner, such as a round robin sequence.

At the mode level 1208, arbitration between the cut-through data packets and the store-and-forward data packets can use weighted arbitration to allocate bandwidth of the fabric between store-and-forward and cut-through in order to provide the fabric guarantee for the cut-through data packets. In an example, the weighting can be dynamically allocated to be substantially equivalent to the port speed. Thus, for example, the cut-through weighting may, for example, be equal to the number of active ports in cut-through, whereas the store-and-forward weighting can be the lesser of: the number of egress ports in store-and-forward; or the total number of store-and-forward port nodes 1216 (which is 11 in the example of FIG. 12) minus the number of cut-through ports. The minimum store-and-forward weighting is one where the number of store-and-forward data packets is non-zero to allow the prior store-and-forward data packets to drain from the fabric. The maximum store-and-forward weighting is the total number of store-and-forward port nodes 1216. Thus, in an example of 100G ports, in FIG. 12, there are four cut-through port nodes 1216 active, and seven store-and-forward port nodes 1216 active, resulting in the cut-through weighting being four, and the store-and-forward weighting being seven. This weighting can be used to ensure that those data packet subject to cut-through processing in the egress and in the ingress can be provided to the egress with a fabric guarantee so that enqueuing in the egress does not "go dry."

Figure 13:
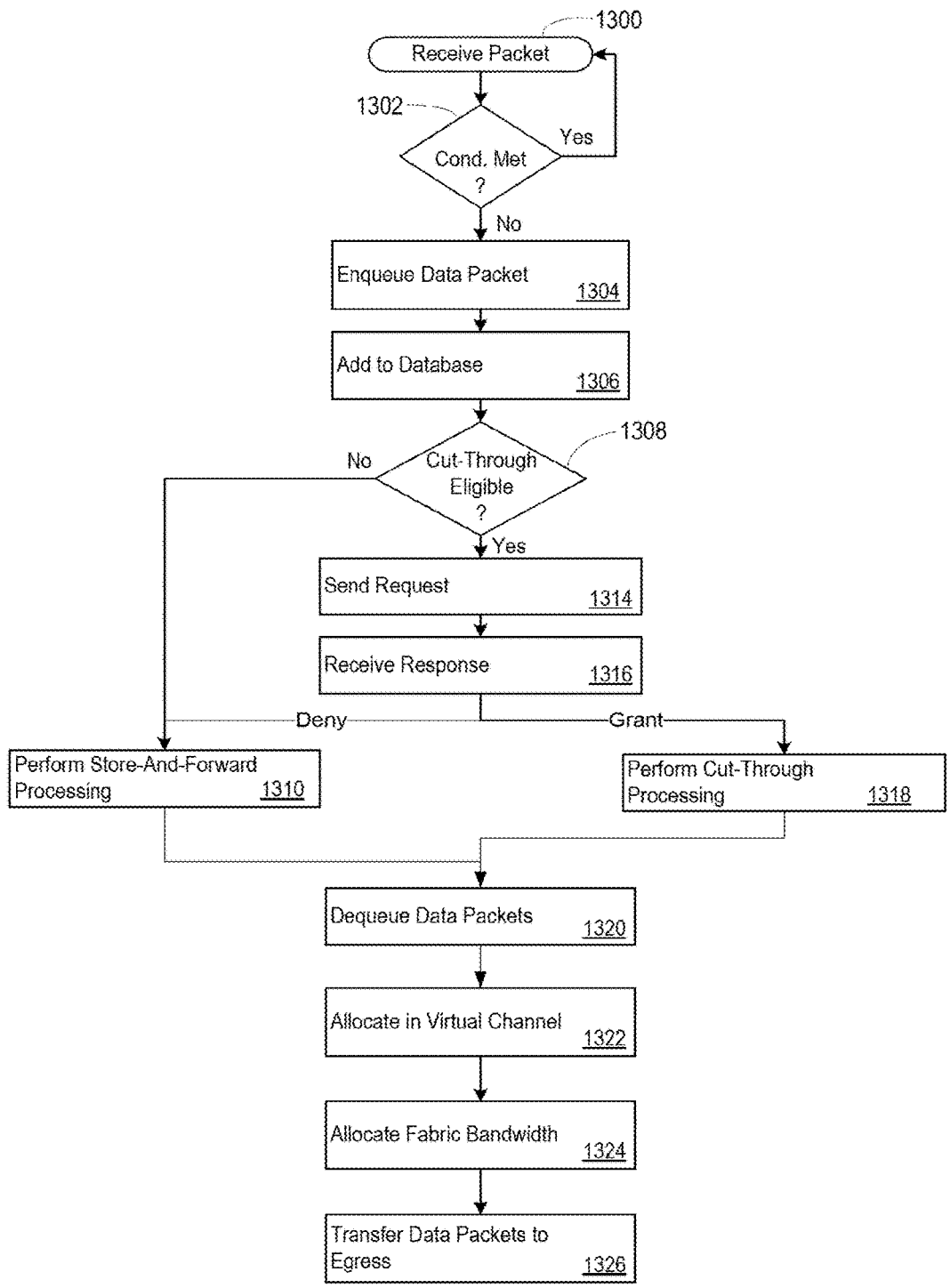
FIG. 13 is an example operational flow diagram illustrating operation of a network device.

FIG. 13 is an example operational flow diagram illustrating operation of a network device, such as a CIOQ switch using early queueing in both an ingress and an egress of the device to minimize latency. In addition, cut-through processing of data packets can be performed at both the ingress and the egress by using a fabric guarantee for those data packets subject to such cut-through processing. Upon receipt of a data packet (1300), the received cell is checked to determine if a predetermined condition is met (1302), such as SOP or a threshold number of cells have been received. If not, the operation returns to await receipt of another data packet. If the predetermined condition is met, the data packet is enqueued (1304) and added to the link database and the packet database (1306). In addition, it is determined if the data packet is eligible for cut-through processing at the ingress and the egress (1308).

If the data packet is not eligible for cut-through processing in the ingress, the data packet is processed in the ingress with store-and-forward processing (1310). If the data packet is eligible for cut-through processing at the ingress, a request message that includes an identified egress output port can be provided from the ingress to the egress. (1314) A response message from the egress, which is responsive to the request can be received at the ingress (1316). If the response message is a denial of the request, the data packet is processed with store-and-forward in the ingress. Where the response is a grant of the request, the data packet may be processed using cut through in the ingress (1316). The cut-through data packets and the store-and-forward data packets can then be dequeued out of the ingress (1320). The store-and-forward data packets and the cut-through data packets can be dequeued into a fabric by allocating each of the data packets to partitions of virtual channel fabric buffer, where each partition can represent a egress output port (1322). The transfer of the data packets through the fabric can be based on a weighted dynamic allocation of the available bandwidth of the fabric in order to provide a fabric transfer guarantee to the cut-through data packets (1324). The cells of the data packets can be transferred through the fabric to the egress using the determined fabric bandwidth allocation under a fabric guarantee based on identification of cut-through eligible egress output ports for the cut-through data packets (1326).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

The invention claimed is:

1. A network device comprising:
   circuitry configured to
   receive, via a network, at least a portion of one of a plurality of data packets;
   initiate enqueuing of the at least the first portion of the one of the data packets prior to receipt by the network device of an entirety of the one of the data packets;
   store linking information for the one of the data packets, the linking information being sequence information related to the plurality of data packets;
   drop the one of the data packets; and
   update the linking information by linking a first data packet indicated in the linking information as sequentially following the one of the data packets being dropped with a second data packet indicated in the linking information as sequentially preceding the one of the data packets being dropped.

2. The network device of claim 1, wherein the circuitry is configured to:
   identify, based on the linking information, a status of a previous data packet, a status of a next data packet and identify the one of the data packets as a current packet.

3. The network device of claim 1, wherein
   the circuitry is configured to update the linking information to remove the linking information of the one of the data packets being dropped.

4. The network device of claim 1, wherein the circuitry is configured to:
   identify a sequence of the data packets as a previous data packet, a current data packet, and a next data packet in the linking information.

5. The network device of claim 1, wherein the circuitry is configured to:
   initiate enqueing the at least the portion of the one of the data packets at a time when the at least the portion of the one of the data packets is identified as a start of the one of the data packets.

6. The network device of claim 1, wherein the circuitry is configured to:
   identify the one of the data packets as a dropped packet; and
   deny enqueuing additional portions of the one of the data packets identified as the dropped packet.

7. The network device of claim 1, wherein
   each of the data packets includes a plurality of cells that are sequentially received from the network, and
   the circuitry is configured to initiate enqueuing of the at least the first portion of the one of the data packets by enqueing cells of the one of the data packets prior to all the cells of the one of the data packets being received at the network device.

8. The electronic device of claim 7, wherein
   the circuitry is configured to commence enqueing cells of the one of the data packets at a time when a cell of the one of the data packets is identified as a start of the one of the data packets.

9. The electronic device of claim 7, wherein
   the circuitry is configured to commence enqueing cells of the one of the data packets at a time when a predetermined number of cells of the one of the data packets are received by the network device.

10. The electronic device of claim 1, wherein the circuitry is configured to:
    communicate a cut through request from an ingress included in the network device to an egress included in the network device, the cut through request comprising a request for prioritized access to a fabric providing a communication path between the ingress and the egress;
    communicate a grant response from the egress to the ingress in response to the cut through request; and
    set an egress port cut through state identifying an output port to which the one of the data packets is provided.

11. A network device comprising:
    a first communication interface configured to receive data packets;
    a second communication interface configured to output the received data packets; and
    traffic management circuitry configured to enqueue portions of a received data packet before the entirety of the data packet is received by the network device, wherein
    the traffic management circuitry comprises
       a packet queue to store information of the received data packet, the information used to identify a previous data packet and a next data packet in a case that the received data packet is dropped; and
       a dequeuer that is triggered by the packet queue to dequeue portions of the received data packet before the entirety of the data packet is received by the network device.

12. The network device of claim 11, wherein
    the information is linking information of the received data packet to link the received data packet to the previous data packet and the next data packet.

13. The network device of claim 11, wherein
    the traffic management circuitry is included in each of an ingress and an egress, and
    the network device further comprises a fabric by which the ingress communicates with the egress.

14. The network device of claim 13, wherein
    the fabric comprises a virtual channel fabric buffer formed to include a plurality of partitions, each of the partitions representative of an output port of the egress.

15. The network device of claim 14, wherein
    the network device is a combined input/output switch, and
    representations of cut-through data packets and representations of store-and-forward data packets are storable in the partitions.

16. The network device of claim 14, wherein
    the virtual channel fabric buffer comprises a first-in first-out circular buffer having a predetermined number of partitions that correspond to a number of output ports included in the egress.

17. A network device comprising:
    means for receiving, via a network, at least a portion of one of a plurality of data packets;
    means for initiating enqueuing of the at least the first portion of the one of the data packets prior to receipt by the network device of an entirety of the one of the data packets;
    means for storing linking information for the one of the data packets, the linking information being sequence information related to the plurality of data packets;
    means for dropping one of the data packets; and
    means for updating the linking information by linking a first data packet indicated in the linking information as sequentially following the one of the data packets being dropped with a second data packet indicated in the linking information as sequentially preceding the one of the data packets being dropped.

18. The network device of claim 17, further comprising:
means for communicating a cut through request from an ingress included in the network device to an egress included in the network device, the cut through request comprising a request for prioritized access to a fabric providing a communication path between the ingress and the egress;
means for communicating a grant response from the egress to the ingress in response to the cut through request; and
means for setting an egress port cut through state identifying an output port to which the one of the data packets is provided.

19. The network device of claim 17, further comprising:
means for identifying, based on the linking information, a status of a previous data packet, a status of a next data packet and identify the one of the data packets as a current packet.

20. The network device of claim 17, further comprising:
means for updating the linking information to remove the linking information of the one of the data packets being dropped.

* * * * *